(12) United States Patent
Satterfield et al.

(10) Patent No.: US 10,503,818 B2
(45) Date of Patent: Dec. 10, 2019

(54) CONTENT AUTHORING INLINE COMMANDS

(71) Applicant: Microsoft Technology Licensing, LLC., Redmond, WA (US)

(72) Inventors: Jesse Clay Satterfield, Seattle, WA (US); Yu Been Lee, Bellevue, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 1002 days.

(21) Appl. No.: 14/995,476

(22) Filed: Jan. 14, 2016

(65) Prior Publication Data

US 2017/0206190 A1    Jul. 20, 2017

(51) Int. Cl.
| | | |
|---|---|---|
| *G06F 17/30* | (2006.01) | |
| *G06F 17/24* | (2006.01) | |
| *G06F 16/9535* | (2019.01) | |
| *G06F 16/2457* | (2019.01) | |
| *G06F 3/0482* | (2013.01) | |
| *G06F 3/0484* | (2013.01) | |
| *G06F 3/0488* | (2013.01) | |

(Continued)

(52) U.S. Cl.
CPC ............ *G06F 17/24* (2013.01); *G06F 3/0482* (2013.01); *G06F 3/0484* (2013.01); *G06F 3/0489* (2013.01); *G06F 3/04886* (2013.01); *G06F 16/24578* (2019.01); *G06F 16/9535* (2019.01); *G06F 17/2765* (2013.01)

(58) Field of Classification Search
None
See application file for complete search history.

(56) References Cited

U.S. PATENT DOCUMENTS

| | | |
|---|---|---|
| 8,452,769 B2 | 5/2013 | Altaf et al. |
| 8,521,517 B2 | 8/2013 | O'Neill |
| 8,688,687 B1 | 4/2014 | Hoelzle et al. |

(Continued)

FOREIGN PATENT DOCUMENTS

| | | |
|---|---|---|
| GB | 2470585 A | 12/2010 |
| WO | 2014100451 A2 | 6/2014 |

OTHER PUBLICATIONS

"International Search Report and Written Opinion Issued in PCT Application No. PCT/US2017/013373", dated May 15, 2017, 13 Pages.

(Continued)

*Primary Examiner* — Hung D Le

(74) *Attorney, Agent, or Firm* — Merchant & Gould

(57) ABSTRACT

Systems, components, devices, and methods for performing inline commands within a content authoring tool are provided. A non-limiting example is a method for generating replacement content within a content authoring canvas. The method includes the steps of receiving a trigger entry in the content authoring canvas and receiving a search text entry and a second trigger entry. The method also includes the steps of generating a search query based on the search text entry and receiving query results based on the generated search query. The query results include at least one option for replacement content. The method also includes the step of proposing replacement content based on the at least one option for replacement content.

20 Claims, 19 Drawing Sheets

(51) Int. Cl.
*G06F 3/0489* (2013.01)
*G06F 17/27* (2006.01)

(56) References Cited

U.S. PATENT DOCUMENTS

| | | | |
|---|---|---|---|
| 8,688,698 B1 | 4/2014 | Black et al. | |
| 8,959,109 B2 | 2/2015 | Scott et al. | |
| 9,037,459 B2 | 5/2015 | Foo | |
| 10,108,739 B2* | 10/2018 | Artz | G06F 3/04842 |
| 2012/0151329 A1* | 6/2012 | Cordasco | G06F 11/3006 |
| | | | 715/234 |
| 2012/0297294 A1 | 11/2012 | Scott et al. | |
| 2013/0297317 A1 | 11/2013 | Lee et al. | |
| 2014/0002377 A1* | 1/2014 | Brauninger | G06F 3/0482 |
| | | | 345/173 |
| 2014/0101544 A1 | 4/2014 | Albrecht et al. | |
| 2014/0108923 A1 | 4/2014 | Bhatt et al. | |
| 2014/0173426 A1 | 6/2014 | Huang et al. | |
| 2014/0243028 A1 | 8/2014 | Colombo et al. | |
| 2014/0280297 A1 | 9/2014 | Gulli et al. | |
| 2015/0163416 A1* | 6/2015 | Nevatie | H04N 5/2723 |
| | | | 348/239 |
| 2015/0324339 A1 | 11/2015 | Gubin et al. | |
| 2015/0379122 A1* | 12/2015 | Fitzpatrick | G06F 17/24 |
| | | | 715/255 |
| 2016/0112729 A1* | 4/2016 | Sayed | H04N 21/234345 |
| | | | 725/10 |
| 2016/0373814 A1* | 12/2016 | Kellner | H04N 21/44008 |
| 2017/0068445 A1* | 3/2017 | Lee | G06F 3/04886 |
| 2018/0011627 A1* | 1/2018 | Siracusano, Jr. | H04L 65/4015 |

OTHER PUBLICATIONS

Dupont, Paula, "40+ Google Docs Tips to Become a Power User", Published on: Feb. 19, 2015 Available at: https://zapier.com/blog/google-docs-tips/.

"Do Quick Research in a Document or Presentation", Retrieved on: Sep. 8, 2015 Available at: https://support.google.com/docs/answer/2481802?hl=en.

\* cited by examiner

CONTENT AUTHORING INLINE COMMANDS

BACKGROUND

Content authoring tools are used to create and edit content files. There are various types of content authoring tools to edit various types of content files. For example, a document authoring tool such as WORD from Microsoft Corporation of Redmond, Wash. is used to edit document content files; a presentation authoring tool such as POWERPOINT® also from Microsoft Corporation is used to edit presentation content files; and a spreadsheet authoring tool such as EXCEL® also from Microsoft Corporation is used to edit spreadsheet content files. The above are, of course, just examples and many other types of content authoring tools are used to edit other content file types as well.

Authoring content files often requires finding information and content from various other sources. For example, a user authoring a document content file may need to conduct multiple web searches to look up information to include in the document. Similarly, a user authoring a document content file or another type of content file may search an image repository for an image to include in the content file. Switching to, for example, a web browser to conduct a search may interrupt the user's progress on the content file, distract the user, and slow down the authoring process.

Additionally, more and more users are authoring content files from mobile devices, such as smartphones, that may have smaller screens where it may not be possible or practical to view a web browser simultaneously with the content authoring tool. Switching to a web browser on a mobile device may be particularly distracting to the user's concentration. Further, copying-and-pasting between a web browser and a content authoring tool is often challenging on a mobile device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Aspects of the present disclosure provide a system and method for performing inline commands within a content authoring tool. In some example inline commands, a trigger entry is received in a content authoring canvas, an associated command is determined for the trigger entry, and replacement content is generated to replace the trigger entry.

In an example, an inline search command is performed to replace a trigger entry on a content authoring canvas. An aspect is a method for generating replacement content within a content authoring canvas. A trigger entry is received in the content authoring canvas. A search text entry and a second trigger entry are also received. A search query is generated based on the search text entry. Query results are received based on the generated search query. Replacement content is proposed based on the query results.

Aspects may be implemented as a computer process, a computing system or as an article of manufacture such as a computer program product or computer readable media. The computer program product may be computer storage media readable by a computer system and encoding a computer program of instructions for executing a computer process.

BRIEF DESCRIPTION OF THE DRAWINGS

The accompanying drawings, which are incorporated in and constitute a part of this disclosure, illustrate various aspects.

DETAILED DESCRIPTION

Figure 1:
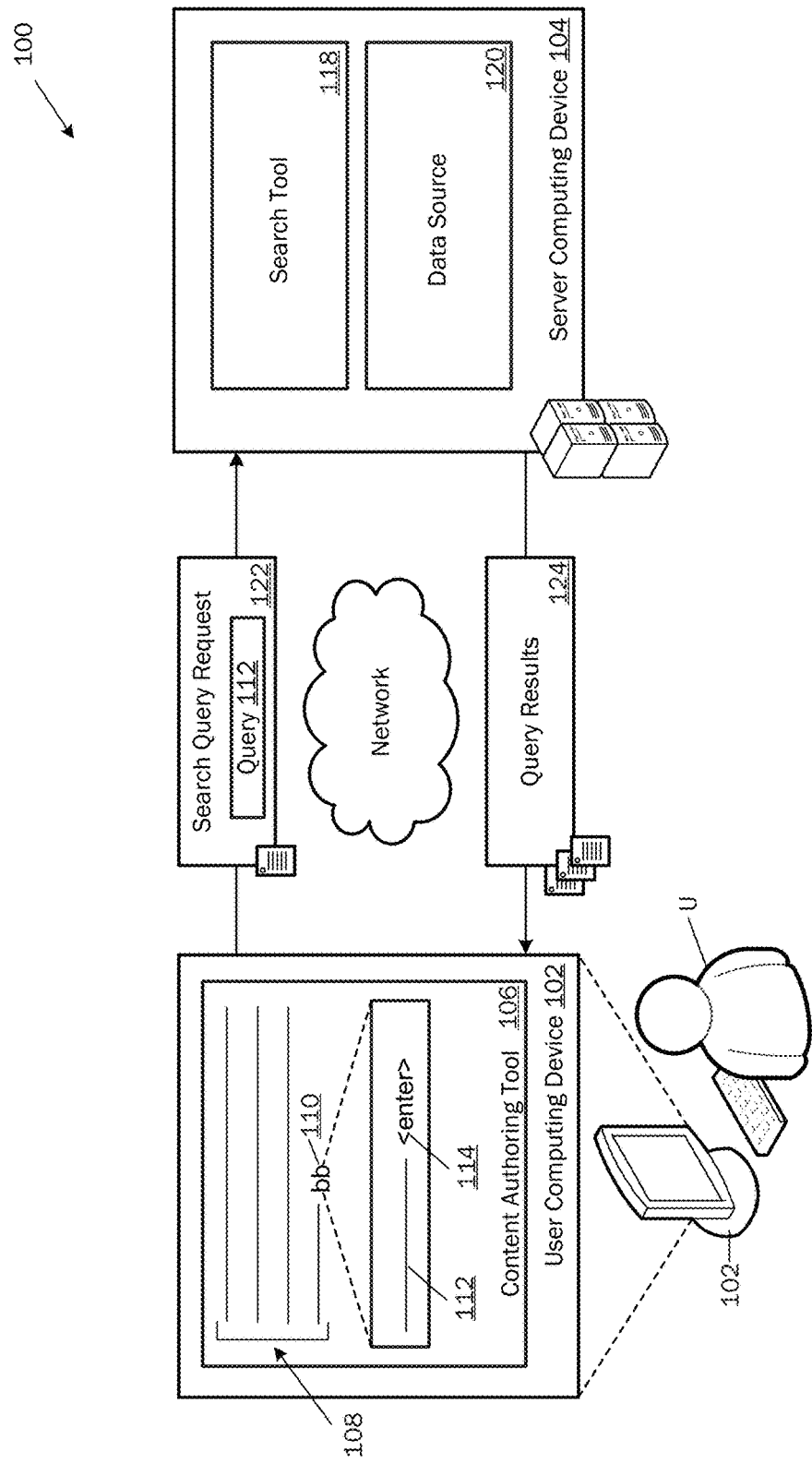
FIG. 1 is a simplified block diagram of one example of a system for providing suggestions for a content file.

Various aspects are described more fully below with reference to the accompanying drawings, which form a part hereof, and which show specific exemplary aspects. However, aspects may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

The present disclosure describes systems and methods for providing inline command functionality within a content authoring tool. In some aspects, the inline commands replace content within content files. Among other benefits, the disclosed technology may allow users to more quickly author content files that combine information and content from various external sources.

A user may use a content authoring tool to create a new content file or to edit an existing content file. This disclosure includes many examples that relate to document content files. It should be understood, however, that many of these examples are applicable to other types of content files as well.

In examples, a content authoring tool receives textual input from a user in the form of keystrokes entered on a physical or virtual keyboard. These keystrokes result in text entry being added to a portion of content file, such as a page in a document. For example, the text entry may comprise a sequence of characters forming one or more words, sentences, paragraphs, etc. Further, the text entry may also include various formatting information relating to the text in the text entry such as a font, a size, a color, a style, etc.

In aspects, the received textual input also includes a trigger entry corresponding to an inline command (e.g., a first trigger entry). The trigger entry may, for example, operate as a signal to perform a particular action or sequence of actions. Various aspects include particular triggers that can be associated with various inline commands. As an example, a trigger entry may be associated with an inline search command that when successfully completed will replace at least the trigger entry with the results of a search. In some aspects, after the trigger entry is received, additional textual input relating to the activities associated with the trigger input may be received.

For example, a user may enter the following textual input: "One of my favorite cities in South America is bb capital of Peru<enter>" using a keyboard. As the content authoring tool receives the textual input, the textual input is directed onto a page of the document content file at least until a complete trigger entry has been received. In this example, the trigger entry is "bb". Thus, once the space after bb is received, the content authoring tool may determine that a trigger entry has been received, and may then determine that the received trigger entry is associated with an inline search command. The trigger entry of bb is just one example, of course, and many other characters or sequences of characters may be used as trigger entries.

The content authoring tool may then visually indicate to the user that an inline search command has been initiated, and prompt the user for a command-specific text entry. In this example, the command-specific text entry is a search query text. Various aspects include various prompts, such as a notice in a region of the content authoring tool user interface. Alternatively, some aspects present a pop-up window with a text box to which textual input is directed. The content authoring tool then treats the textual input received after the trigger input as the search query text until a second trigger entry is received. In this example, the search query text is "capital of Peru" and the second trigger entry is the return key.

In this example, once the second trigger entry is received, the content authoring tool generates a search query using the search query text. The content authoring tool may then execute the search query using a search tool such as the BING® Web search tool from Microsoft Corporation of Redmond, Wash. or the GOOGLE® Web search tool from Google Inc. of Mountain View, Calif. If the search results include a high-confidence result, the content authoring tool will generate proposed replacement content based on the high-confidence result. In some aspects, the content authoring tool then replaces the trigger entry and the command-specific text entry with the proposed replacement content. In the "capital of Peru" example, it is likely that a high-confidence result of "Lima" would be returned by at least some search tools. Accordingly, after the inline search command is complete, the user's entry of "One of my favorite cities in South America is bb capital of Peru<enter>" would become "One of my favorite cities in South America is Lima".

Beneficially, this example inline command allows the user to continue working in the content authoring tool throughout the search so that the user's concentration is not broken by switching to a search tool. In some aspects, the content authoring tool is configured to process the inline search command in the background while continuing to receive textual input from the user. Additionally, in some aspects, multiple active inline search commands may be processed simultaneously.

For some search queries, the search results do not include a high-confidence answer but instead include multiple lower-confidence potential answers. In some aspects, the content authoring tool may generate a notice to the user that additional user input is needed to complete the inline search command. Then, the content authoring tool may generate a prompt such as a drop-down list that includes a plurality of options for the replacement content. In some aspects, the drop-down list also includes an option to launch a web browser (e.g., within the content authoring tool or externally) so that the user can conduct further searching for an appropriate answer. In aspects, this prompt is displayed as soon as the search results are received. Alternatively or additionally, the content authoring tool generates an indication (e.g., a notice on a menu bar or a change to the format of the trigger entry text) that the results are ready. In this case, the prompt may be displayed after the content authoring tool receives an input indicating that the user would like to review the plurality of options.

Additionally or alternatively, in some aspects, the content authoring tool may evaluate contextual information from elsewhere in the content file to try to identify a single answer from the plurality of options or to at least reduce the number of options that are presented to the user. Further, some aspects may extract additional context information from the document at the time the search query is generated. For example, if the search query text includes a homograph or word having multiple or ambiguous meanings, the content authoring tool may generate a search query based on context from the content file to help the search tool ascribe an appropriate meaning to the search query. Generating the search query may comprise replacing the homograph or ambiguous word with a synonym or adding an additional term that clarifies the meaning of the homograph or ambiguous word.

In yet other situations, the search results do not include any high-confidence answers. In some aspects, the content authoring tool will then display a notice that includes a hyperlink to the full search results from the search tool. In some aspects, the hyperlink will invoke a Web browser to display the search results and allow the user to navigate through the results to search for an answer. In aspects, the search tool includes functionality to select a portion of text on a Web page as the replacement text. This selected text will then be transmitted back to the content authoring tool, which will use the text to replace the trigger entry and, if appropriate, the search query text.

In some aspects, the previous search queries and results that are selected are used to provide additional context when generating search queries or selecting potential answers from search results. Additionally, information about the user or known user preferences may be used to determine context in some aspects. For example, the result of a search query for "distance between Portland, Oreg. and Vancouver, BC" could be expressed in either miles or kilometers. Some aspects select how to represent a high-confidence result based on a user preference. The user preference may be determined based on a setting within the content authoring tool. The user preference may also be determined based on evaluation of previous selections from the user (e.g., whether the user previously selected a response represented in miles or kilometers, or whether the user previously selected a response represented using metric units). The user preference may also be inferred from other information that may be known about the user, such as the location of the user (e.g., a user in the United States may be more likely to prefer a response expressed in miles than kilometers, while a user in Canada may prefer kilometers to miles).

In some aspects, various other inline commands are supported as well. For example, some aspects include inline commands to search for and insert a picture based on a query text, create a table, change a font property, or other actions.

FIG. 1 is a simplified block diagram of one example of a system 100 for providing suggestions for a content file. As illustrated in FIG. 1, the system 100 includes a user computing device 102 that is operable by a user U and a server computing device 104. The user computing device 102 and the server computing device 104 communicate over a network.

The user computing device 102 includes a content authoring tool 106. In some aspects, the content authoring tool 106 is an application running on the user computing device 102 that is operable to create or edit content files. Additionally, in some aspects, the content authoring tool 106 interacts with the server computing device 104. In some examples, the content authoring tool 106 is a browser application operable to generate interactive graphical user interfaces based on content served by a remote computing device such as the server computing device 104 or another computing device. According to an example, an extension is installed on the user computing device 102 as a plug-in or add-on to the browser application (i.e., content authoring tool 106) or is embedded in the browser application.

In an example, the content authoring tool 106 is a document authoring tool that operates to generate, edit, and display documents that include text. The WORD document authoring tool, from Microsoft Corporation of Redmond, Wash., is an example of a presentation editor. Other example document authoring tools include: WORDPERFECT®, from Corel Corporation of Ottawa, Canada; GOOGLE DOCS, from Google Inc. of Mountain View, Calif.; IWORK PAGES®, from Apple Inc. of Cupertino, Calif.; and LIBRE-OFFICE®, from The Document Foundation of Berlin, Germany. In other examples, the content authoring tool 106 is a presentation authoring tool, such as the POWERPOINT® presentation authoring tool, from Microsoft Corporation of Redmond, Wash., or a spreadsheet authoring tool, such as the EXCEL® spreadsheet authoring tool, also from Microsoft Corporation.

In the example shown in FIG. 1, the content authoring tool 106 receives textual input from the user U including a text entry 108, a trigger entry 110, a search query text entry 112, and a second trigger entry 114. In this example, the textual input relates to an inline search command, and the search query text entry 112 is an example of a command-specific text entry that is specific to the example inline search command. In some aspects, when the trigger entry 110 is received, the content authoring tool 106 displays a textbox in which the search query text entry 112 and second trigger entry 114 may be input by a user. Example interfaces generated by aspects of the content authoring tool 106 are described throughout, including with respect to at least FIGS. 2-13.

The content authoring tool 106 generates a search query request 122 and transmits the search query request 122 to the server computing device 104. In some aspects, the search query request 122 includes the search query text entry 112. In return, the server computing device 104 transmits query results 124 for the search query request 122 back to the user computing device 102. In some aspects, the content authoring tool 106 then replaces the trigger entry 110 with text from the query results 124. In this manner, the user can easily insert information (or other content) based on a search query into a content file without leaving the content authoring tool 106.

In the example shown in FIG. 1, the server computing device 104 includes a search tool 118 and a data source 120. The search tool 118 operates to receive the search query request 122 and execute the query against the data source 120 to generate the query results 124, which are then transmitted by the server computing device 104 to the user computing device 102.

In some aspects, the data source 120 is an index or partial cache of a data source that is external to the server computing device 104, such as the Web (the Internet), a corporate intranet, or another external data source. Additionally or alternatively, the data source 120 stores various other information or content directly.

In some aspects, the search tool 118 generates and includes confidence scores in the query results 124. The confidence score may reflect the likelihood that the particular result in the query results 124 is the answer to the search query request 122.

Figure 2:
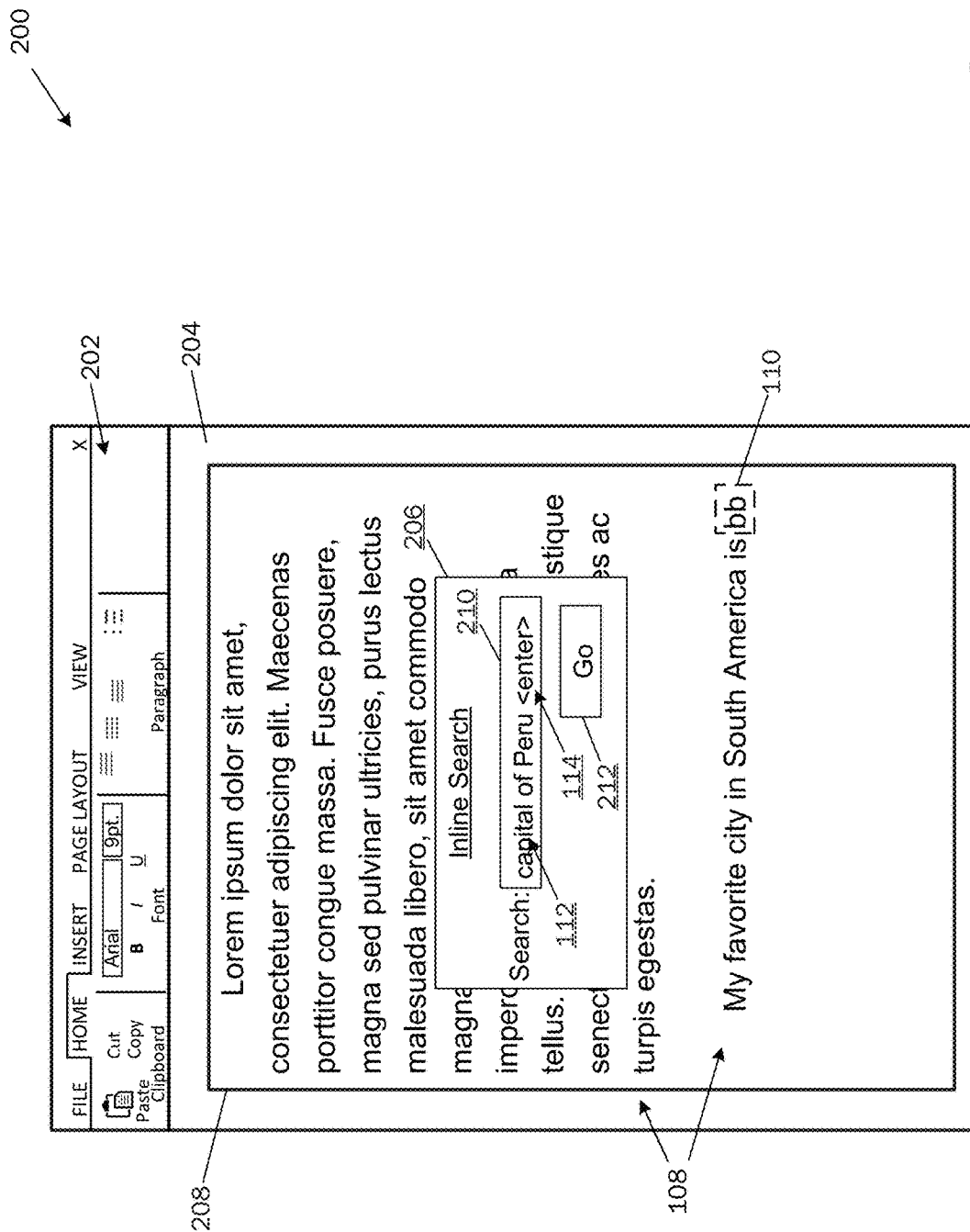
FIG. 2 illustrates an example user interface screen generated by aspects of the content authoring tool of FIG. 1 while an example inline command is being initiated.

FIG. 2 illustrates an example user interface screen 200 generated by aspects of the content authoring tool 106 and displayed by the user computing device 102. In this example, the screen 200 includes a toolbar 202, a content region display area 204, and a popup window 206 for an inline search. In this example, a user is performing an inline search. An inline search is an example of an inline command for content authoring.

The toolbar 202 includes various tools and settings related to authoring the content, such as: cut, copy, and paste tools; font settings; paragraph formatting settings; etc. In other aspects, the toolbar 202 includes fewer, additional, or different tools and settings.

The content region display area 204 operates to display one or more content regions from a content file. In some aspects, a user can interact with and modify the content region that is displayed by adding, removing, repositioning, or otherwise modifying various content elements of the content region display area 204. For instance, content in the content region display area 204 may be added or modified via user keystrokes on a keypad such as a physical keyboard or virtual (or soft) keyboard.

In this example, the content region display area 204 displays a page 208 from an example document content file. The page 208 is an example of a content authoring canvas. Other examples of content authoring canvases include slides and spreadsheets.

In some aspects, the content region display area 204 displays a portion of a page rather than a whole page. Alternatively or additionally, the content region display area 204 may display multiple pages.

In this example, the page 208 includes the text entry 108 and the trigger entry 110. The text entry 108 represents text the user has added to the page 208. In aspects, various techniques may be used to add text to the page 208. For example, the user may type some or all of the characters in the text entry 108 using a keyboard, such as a physical keyboard or a virtual (or soft) keyboard that is generated and displayed on the screen 200. Alternatively or additionally, a user may enter some or all of the text entry 108 via copy and paste, voice commands via a device microphone, handwritten commands via a stylus, pen, or other writing implement, and/or other suitable commands.

The trigger entry 110 is a user input that the content authoring tool 106 recognizes as being associated with an inline command. In some aspects, the trigger entry 110 is a sequence of characters that are input into the page 208. In the example shown, the trigger entry 110 is "bb" (i.e., an initial space, then two lower-case b's, followed by a space). Additionally or alternatively, in some aspects, a particular character sequence does not include an initial space but is still only recognized as being a trigger entry when the character sequence follows a new line, space, or other character that indicates the character sequence is not part of a word. Additionally or alternatively, in some aspects, the trigger entry 110 is a combination of keystrokes that do not necessarily result in characters being input on the page 208. For example, in some aspects, a combination of the ctrl key and at least one other key is recognized as a trigger entry. Other aspects are possible as well.

In this example, the popup window 206 is displayed by the content authoring tool 106 because the trigger entry 110 was received, and the content authoring tool 106 determined that received trigger entry 110 is associated with an inline search. In some aspects, the content authoring tool 106 determines that a trigger entry 110 has been received by comparing a sequence of a predetermined number of the most recently received characters to a list of character sequences associated with trigger entries. In some aspects, the content authoring tool 106 compares the predetermined number of received characters to the list of character sequences associated with trigger entries upon receiving a particular character (e.g., upon receiving a space character, in aspects where all of the trigger entries end with a space character). Once the content authoring tool 106 determines that the trigger entry 110 has been received, the content authoring tool 106 determines which, if any, actions should be performed. In some aspects, the content authoring tool 106 maintains or accesses a table of trigger entry values that stores actions associated with each of the trigger entry values. The actions may comprise instructions for one or more of: generating a query, displaying various user interface elements, and executing a query using a particular search tool.

In FIG. 2, the content authoring tool 106 performs the action of displaying the popup window 206. Additionally, the content authoring tool 106 redirects keystrokes received from the user to the popup window 206. In this manner, the user may continue typing fluidly without having to take any additional action to redirect keystrokes to the popup window 206.

In some aspects, the popup window 206 includes a textbox 210 and a go (e.g., submit) button 212. The textbox 210 operates to receive and display the search query text entry 112 from the user. The popup window 206 also operates to receive the second trigger entry 114. The second trigger entry 114 communicates to the content authoring tool 106 that the user has completed entering the search query text entry 112. In this example, the search query text entry is "capital of Peru" and the second trigger entry 114 is received when the user strikes the enter key (shown as <enter> in FIG. 2). Alternatively, the content authoring tool 106 can receive the second trigger entry 114 when the user activates the go button 212. In aspects, the go button 212 is activated by clicking on it or by touching it. Upon receiving the second trigger entry 114, the content authoring tool 106 determines which additional actions to perform. In some aspects, the content authoring tool 106 checks a record in a table that is associated with the inline command being executed to determine the additional actions to perform. The table may specify how to generate a query based on the search query text entry 112, how to execute the query, and/or which search tool to use to perform the query.

With regard to the example inline search command, the content authoring tool 106 generates and executes a query based on the search query text entry 112. Additionally, when the second trigger entry 114 is received the content authoring tool 106 redirects keystrokes received from the user back to the page 208 so that the user can continue authoring the document content file.

Figure 3:
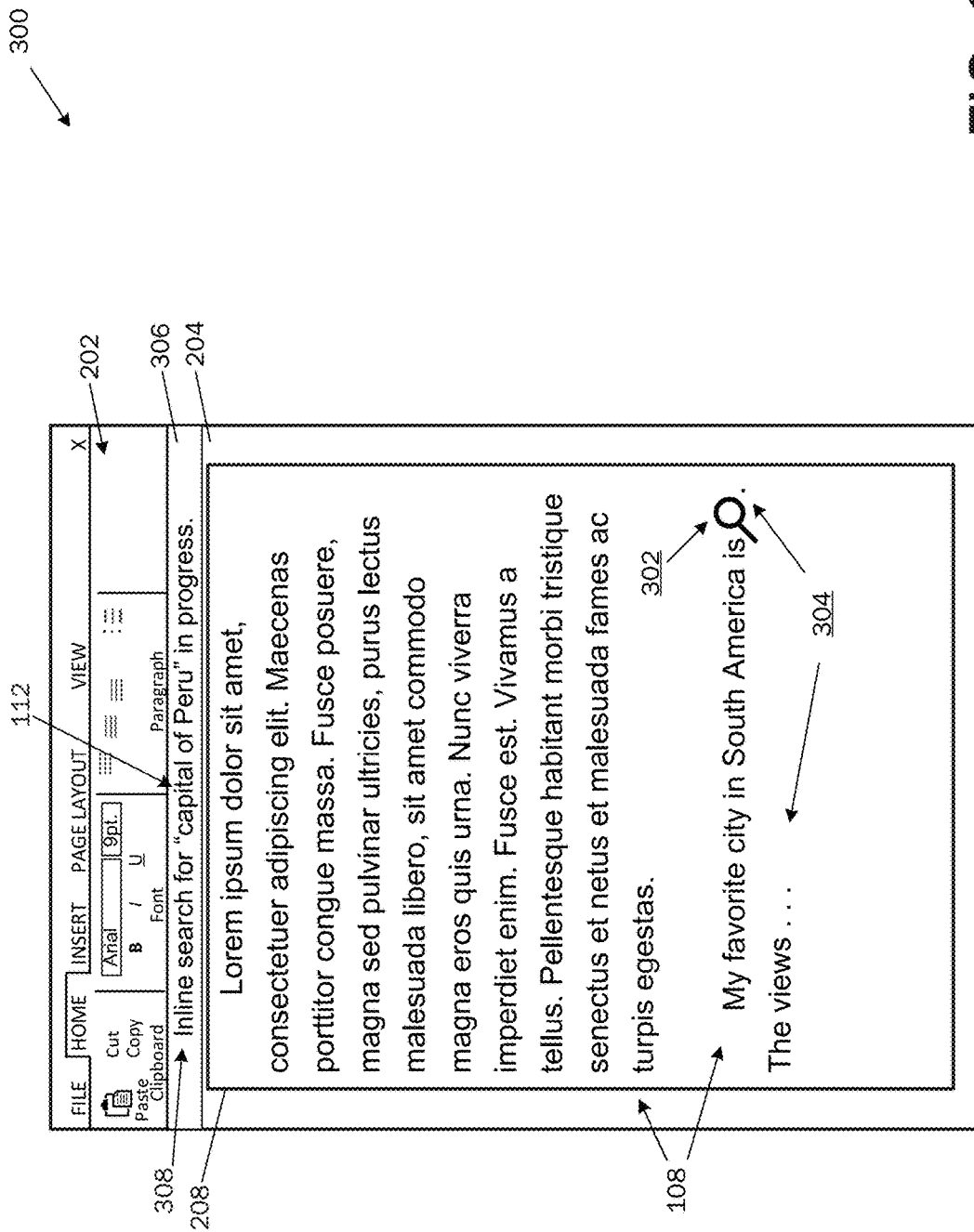
FIG. 3 illustrates an example user interface screen generated by aspects of the content authoring tool of FIG. 1 while an example inline command is being performed.

Turning now to FIG. 3, an example user interface screen 300 generated by aspects of the content authoring tool 106 and displayed by the user computing device 102 is illustrated. In aspects, the user interface screen 300 is displayed after the second trigger entry 114 is received by the content authoring tool 106 (e.g., as described with respect to at least FIG. 2). In this example, the screen 300 includes the toolbar 202, the content region display area 204, and a notification message region 306.

In this example, the page 208 now includes an inline search indicator 302 and a post-command text entry 304. The inline search indicator 302 replaces the trigger entry 110 (shown in FIG. 2) and indicates that an inline search is currently being performed for content to replace the inline search indicator 302. As illustrated, the inline search indicator 302 is shown as an icon of a magnifying glass, but as will be appreciated, the inline search indicator 302 may be presented differently in other aspects, for example, as an hourglass icon, a spinning wheel icon, a progress bar, etc.

The post-command text entry 304 may be similar to the text entry 108 except that the post-command text entry 304 corresponds to text input received after the inline command has been started. In some aspects, the content authoring tool 106 receives text entries while the inline command is being performed (i.e., the post-command text entry 304 is received in parallel with performance of the inline command). In this manner, the user may continue with authoring activities without waiting for the inline command to complete.

The notification message region 306 is a region for communicating information to users. In this example, the notification message region 306 is disposed between the toolbar 202 and the content region display area 204. In other aspects, the notification message region 306 is disposed elsewhere, such as along the bottom of the content region display area 204 or in another location. In some aspects, the notification message region 306 includes a message 308. In this example, the message 308 indicates that an inline search is being performed and reads: "Inline search for 'capital of Peru' in progress." In this example, the message includes the search query text entry 112. In other aspects, the message 308 includes additional or different information.

Figure 4:
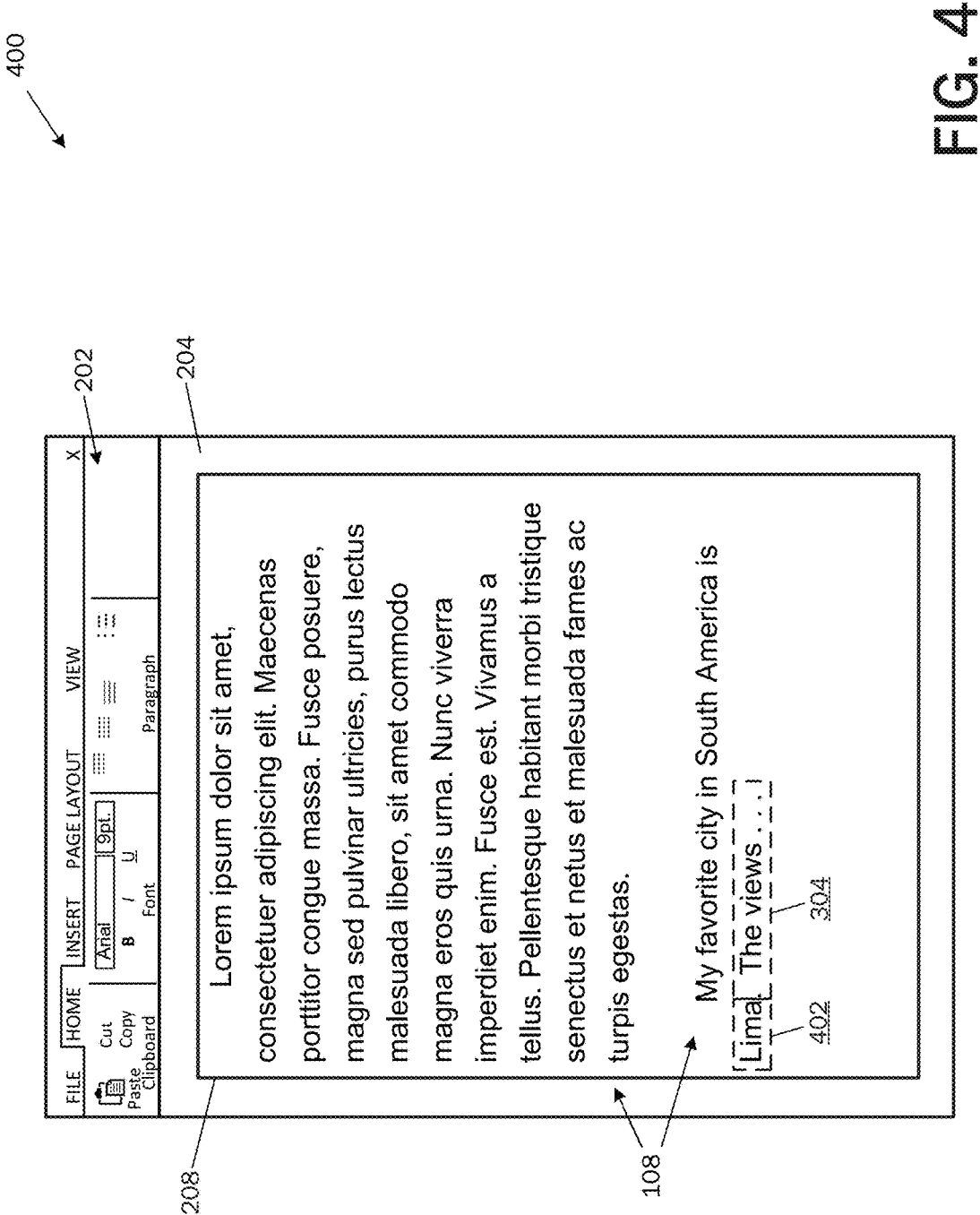
FIG. 4 illustrates an example user interface screen generated by aspects of the content authoring tool of FIG. 1 after an example inline command has been completed.

Turning now to FIG. 4, the example of FIGS. 2-3 is continued. FIG. 4 illustrates an example user interface screen 400 generated by aspects of the content authoring tool 106 and displayed by the user computing device 102. In aspects, the user interface screen 400 is displayed after an inline search command is completed (e.g., the inline command that is described as being initiated in FIG. 2, and in-progress in FIG. 3). In this example, the screen 400 includes the toolbar 202 and the content region display area 204.

The content region display area 204 includes the page 208. The page 208 includes the text entry 108, replacement content 402, and the post-command text entry 304. The replacement content 402 includes content generated by the inline command. In this example, the replacement content 402 is generated based on the query results 124 (shown in FIG. 1) from the inline search command. In some aspects, the replacement content 402 is added to the page 208 without any indication that the replacement content 402 was generated by an inline command. Other aspects include various indications (either in a user interface generated by the content authoring tool 106 or in the content file itself) that the replacement content 402 was generated using an inline command. For example, in some aspects, a footnote or indicator that indicates that the replacement content 402 was generated using an inline command or identifies a source for the replacement content 402. Additionally or alternatively, some aspects include user interface elements to indicate that the replacement content 402 was generated by an inline command. Examples of some of these aspects are illustrated and described with respect to at least FIG. 5.

In this example, the query results 124 for the search query text entry 112 of "capital of Peru" include a high confidence answer of "Lima" and so, the trigger entry 110 (or the inline search indicator 302) is replaced with the replacement content 402. Alternatively, if the query results 124 do not include a high confidence answer, the content authoring tool 106 may generate a different user interface for the user to identify the desired replacement content. Examples of these interfaces are illustrated and described with respect to at least FIGS. 9-10.

Figure 5:
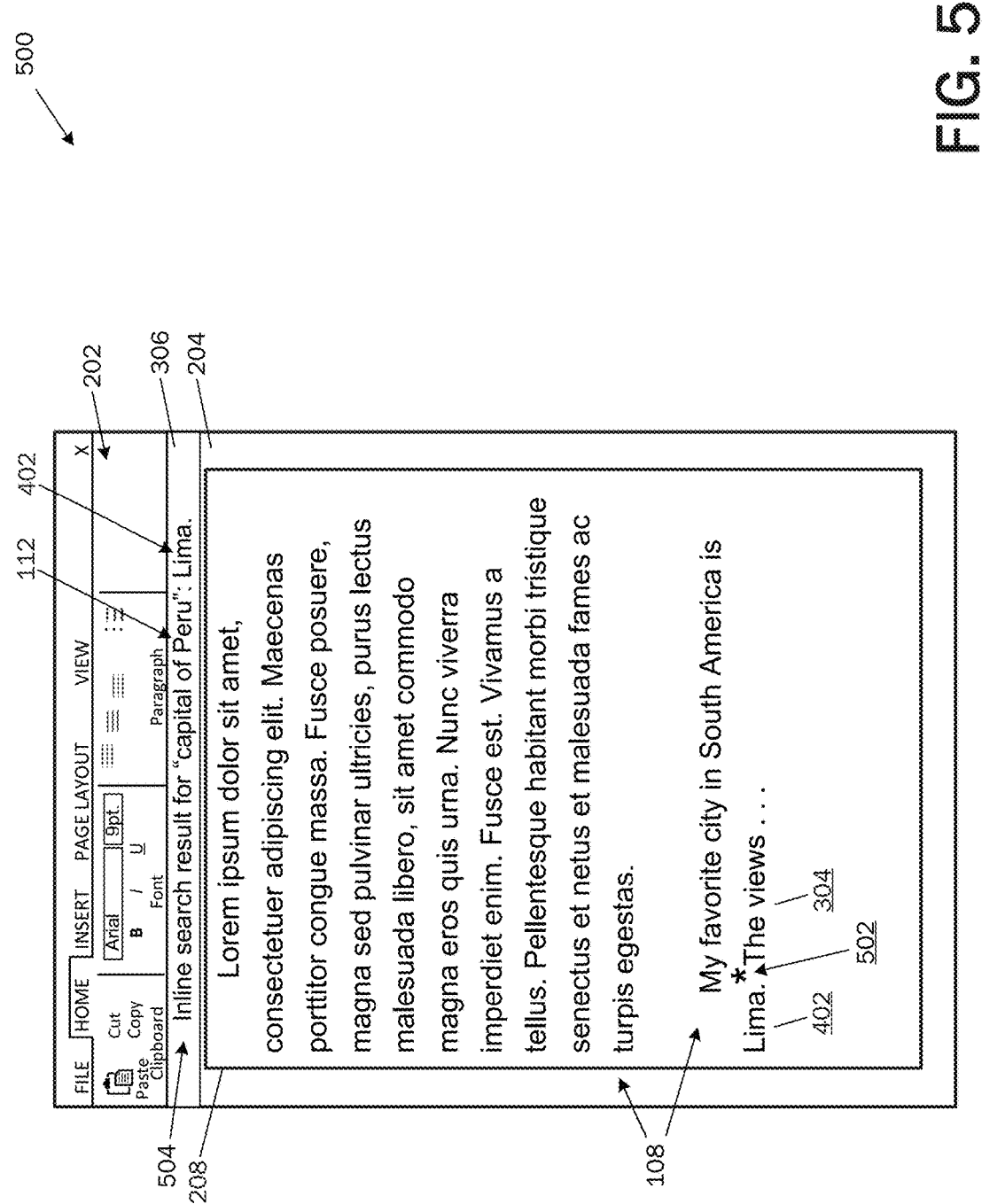
FIG. 5 illustrates another example user interface screen generated by aspects of the content authoring tool of FIG. 1 after an example inline command has been completed.

FIG. 5 illustrates an example user interface screen 500 generated by aspects of the content authoring tool 106 and displayed by the user computing device 102. In aspects, the user interface screen 500 is displayed after an inline search command is completed (e.g., the inline command that is described as being initiated in FIG. 2 and in-progress in FIG. 3). The screen 500 may be similar to the screen 400, except that it additionally includes an inline command complete indicator 502 and the notification message region 306, which includes a message 504. In aspects, the screen 500 includes the toolbar 202 and the content region display area 204. Some aspects include one or the other of the inline command complete indicator 502 and the notification message region 306.

The inline command complete indicator 502 is shown on the page 208 in proximity to the replacement content 402. The inline command complete indicator 502 indicates that the inline command is complete and that the replacement content 402 was added to the page 208 based on the inline command. In this example, the inline command complete indicator 502 is shown as a large asterisk disposed near the replacement content 402. In some aspects, the inline command complete indicator 502 is shown on the screen 500, but does not become part of the content file (e.g., the inline command complete indicator 502 overlays the page 208). In some aspects, the inline command complete indicator 502 is added to the content file. Additionally, in some aspects, the inline command complete indicator 502 is an actuatable user interface element that, when actuated, displays information about the inline command (e.g.; the type of inline command that was performed; the parameters to the inline command, such as the search query text entry 112; the source of the replacement content 402, such as a hyperlink to a source website).

In this example, the notification message region 306 includes the message 504. The message 504 indicates that the inline command is complete and reads: "Inline search result for 'capital of Peru': Lima." In this example, the message 504 includes the search query text entry 112 and the replacement content 402. In some aspects, the message 504 may also include information about the source of the replacement content 402, such as a hyperlink to a source website. In aspects, the notification message region 306 includes a user-actuatable control that, when actuated, brings the focus of the content authoring tool to the replacement content 402 (e.g., by repositioning a cursor for entering text, or switching to the page 208 if another page is being shown).

Figure 6:
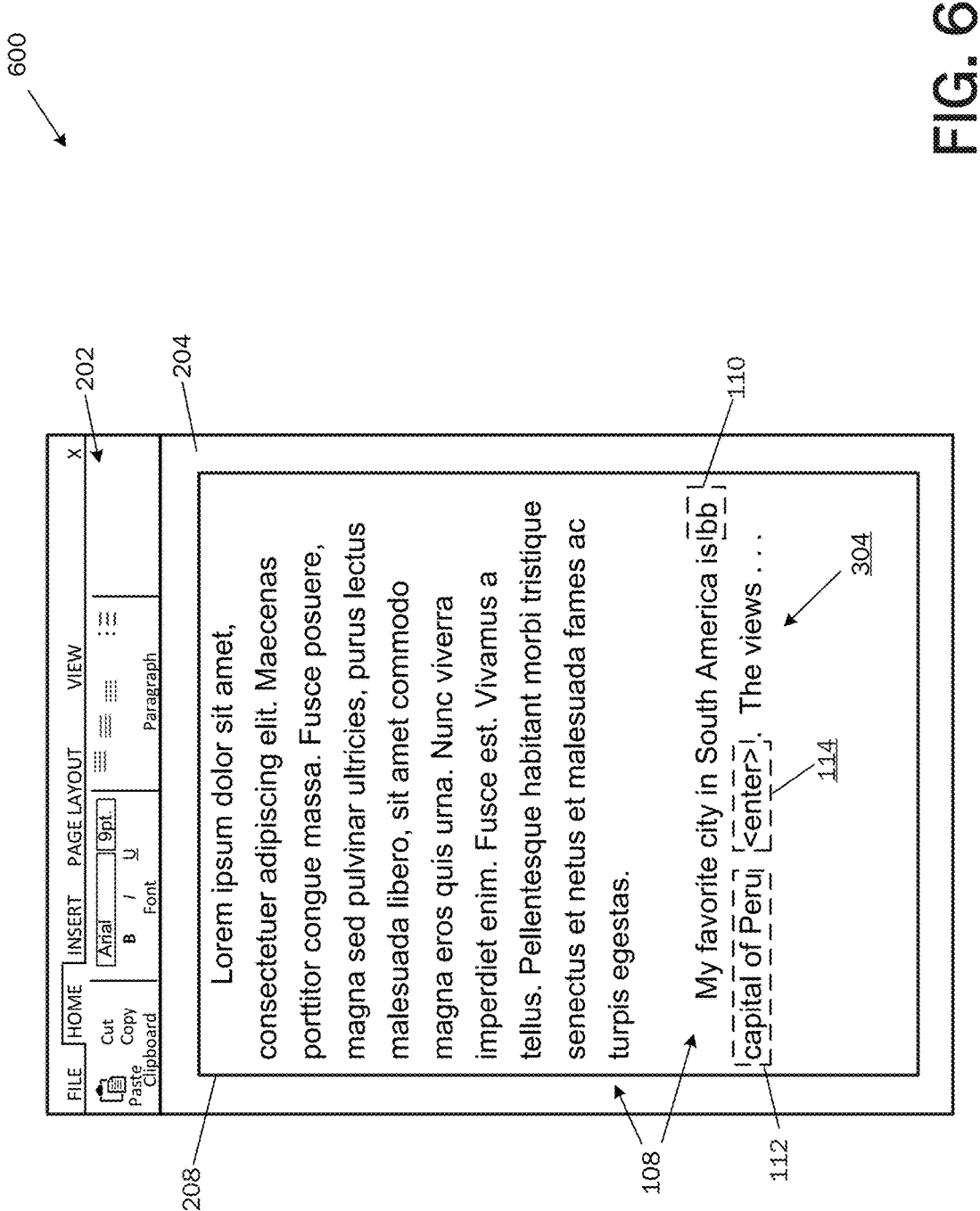
FIG. 6 illustrates another example user interface screen generated by aspects of the content authoring tool of FIG. 1 while an example inline command is being initiated.

FIG. 6 illustrates an example user interface screen 600 generated by aspects of the content authoring tool 106 and displayed by the user computing device 102. The screen 600 may be similar to the screen 200, except that it does not include the popup window 206. In aspects, the screen 600 includes the toolbar 202 and the content region display area 204. In this example, a user is performing an inline search.

In this example, the page 208 includes the text entry 108, the trigger entry 110, the search query text entry 112, the second trigger entry 114, and the post-command text entry 304 all in a sequence. It should be understood that in at least some aspects, the second trigger entry 114 is not actually displayed on the page 208 but instead simply triggers the execution of the inline command. Upon receiving the second trigger entry 114, the content authoring tool 106 begins performing an inline search using the search query text entry 112. In some aspects, the content authoring tool 106 receives the post-command text entry 304 concurrently with performing the inline search command. When the inline search command is completed, the trigger entry 110 and the search query text entry 112 are replaced by the replacement content 402 (e.g., as shown in FIG. 4).

Figure 7:
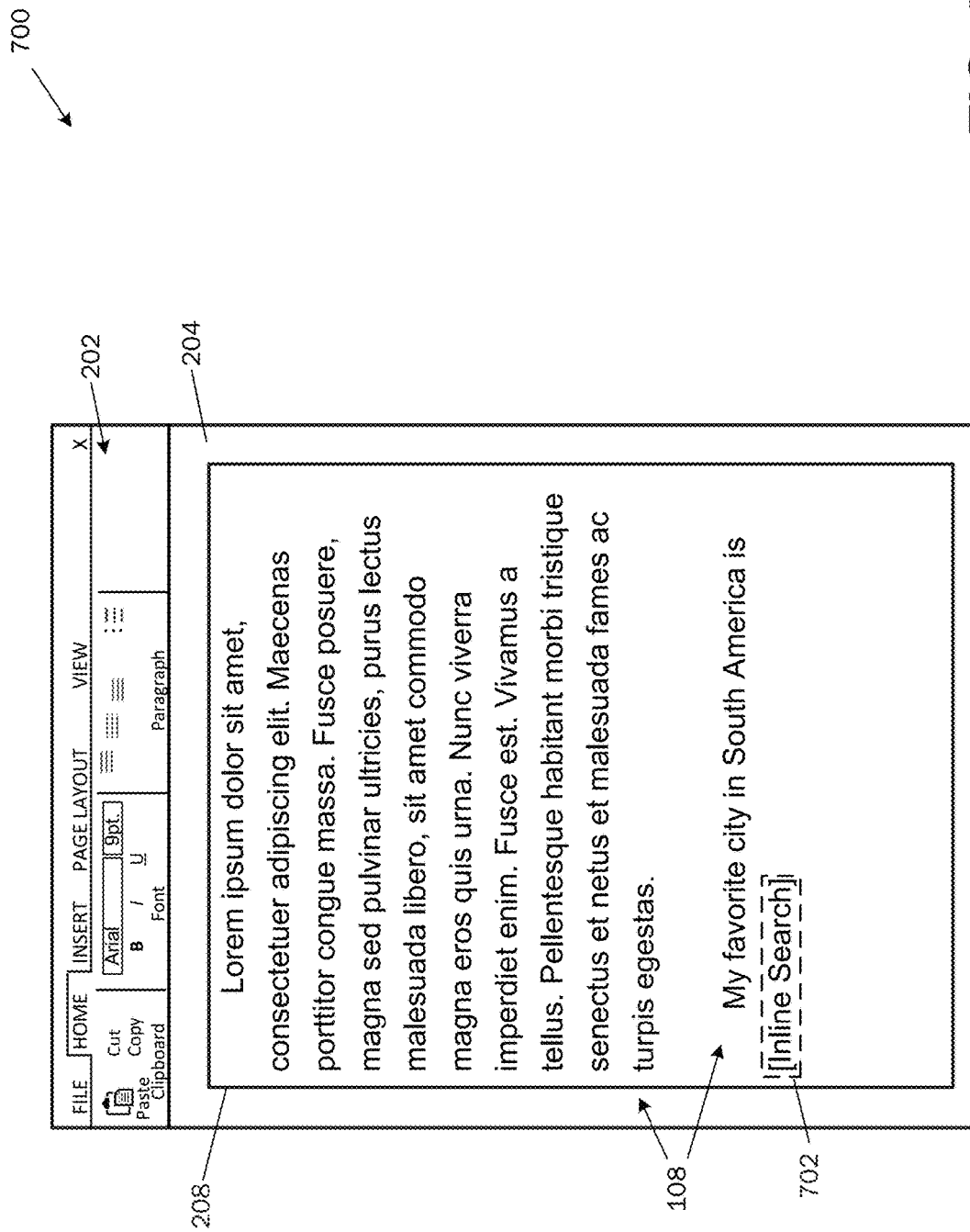
FIG. 7 illustrates another example user interface screen generated by aspects of the content authoring tool of FIG. 1 while an example inline command is being initiated.

FIG. 7 illustrates an example user interface screen 700 generated by aspects of the content authoring tool 106 and displayed by the user computing device 102. The screen 700 may be similar to the screen 200, except that it does not include the popup window 206. In aspects, the screen 700 includes the toolbar 202 and the content region display area 204. In this example, a user is performing an inline search.

In this example, the page 208 includes the text entry 108, and an inline command descriptor 702. In aspects, the inline command descriptor 702 is a textual description of the inline command associated with a received trigger entry 110. The system 100 may replace the trigger entry 110 with the inline command descriptor 702 upon determining that a trigger entry 110 has been received. As shown in this example, the trigger entry 110 of "bb" has been replaced by the inline command descriptor 702, which reads: "[Inline Search]." In some aspects, the replacement occurs immediately after the final space (or other character) of the trigger entry 110 is received. In aspects, the inline command descriptor 702 may provide contextual feedback to a user regarding the inline command that is currently in progress.

Figure 8:
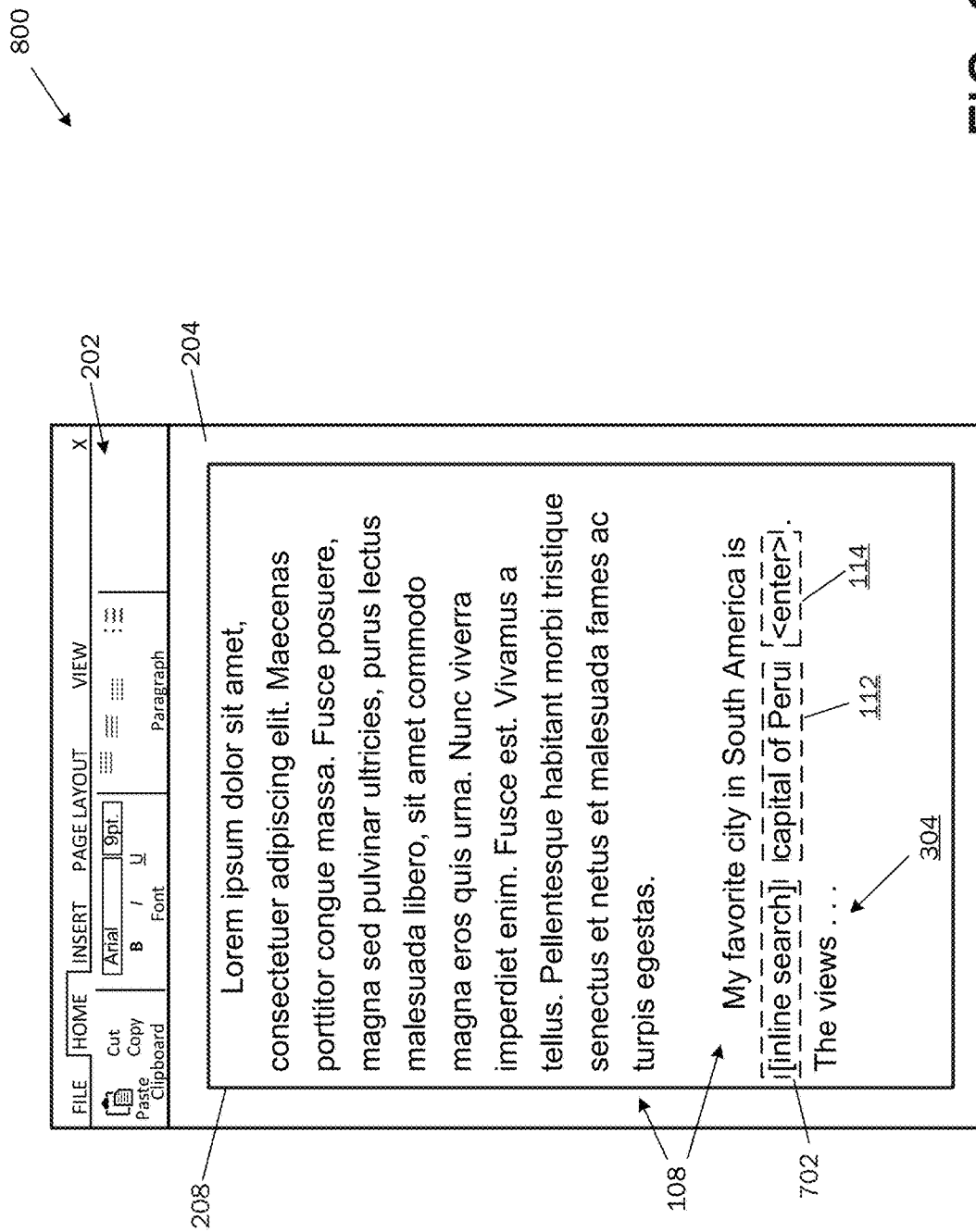
FIG. 8 illustrates another example user interface screen generated by aspects of the content authoring tool of FIG. 1 while an example inline command is being initiated.

FIG. 8 illustrates an example user interface screen 800 generated by aspects of the content authoring tool 106 and displayed by the user computing device 102. The screen 800 may be similar to the screen 600, except that rather than including the trigger entry 110, the screen 800 includes the inline command descriptor 702. In aspects, the screen 800 includes the toolbar 202 and the content region display area 204. In this example, a user is performing an inline search.

In this example, the page 208 includes the text entry 108, the inline command descriptor 702, the search query text entry 112, the second trigger entry 114, and the post-command text entry 304 all in a sequence. As described previously with respect to FIG. 7, the inline command descriptor 702 replaces the trigger entry 110 in at least some aspects. As described previously with respect to FIG. 6, upon receiving the second trigger entry 114, the content authoring tool 106 begins performing an inline search using the search query text entry 112. In some aspects, the post-command text entry 304 may be received while the content authoring tool 106 is performing the inline search. When the inline search is completed, the inline command descriptor 702 and the search query text entry 112 are replaced by the replacement content 402 (e.g., as shown in FIG. 4).

Figure 9:
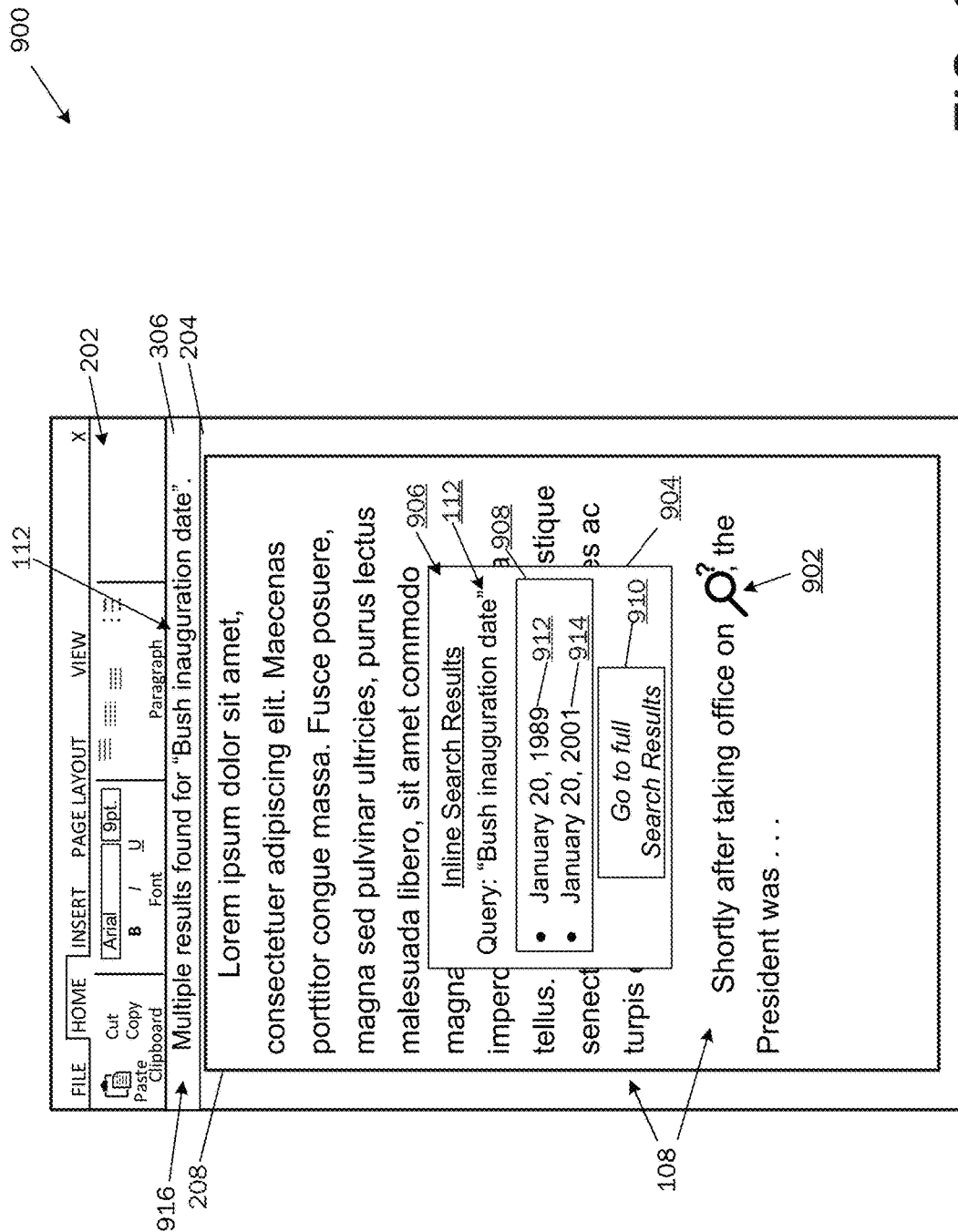
FIG. 9 illustrates an example user interface screen generated by aspects of the content authoring tool of FIG. 1 when an example inline search command finds multiple options for replacement content.

FIG. 9 illustrates an example user interface screen 900 generated by aspects of the content authoring tool 106 and displayed by the user computing device 102. In aspects, the user interface screen 900 is displayed when query results for an inline search command have been received and the results include multiple candidates for the replacement content. In aspects, the screen 900 includes the toolbar 202, the content region display area 204, the notification message region 306, and a popup content selection window 904.

In this example, a user is performing an inline search similar to the search illustrated and described with respect to at least FIGS. 2-6, except that the results of the search include multiple candidates for the replacement content rather than a high confidence replacement text that is used without further instructions from the user.

As shown in FIG. 9, the page 208 includes the text entry 108 and an inline command input needed indicator 902. The inline command input needed indicator 902 may replace the inline search indicator 302 when results are received that include multiple candidates for the replacement content 402. As illustrated, the inline command input needed indicator 902 is shown as an icon of a magnifying glass with a question mark, but as will be appreciated, in other aspects the inline command input needed indicator 902 may take different appearances. In some aspects, the inline command input needed indicator 902 includes a user-actuatable control that, upon being actuated, causes the popup content selection window 904 to be displayed. In other aspects, the popup content selection window 904 is displayed when the content authoring tool 106 receives search results that include multiple candidates for the replacement content 402.

The popup content selection window 904 includes a header section 906, a replacement content selector 908, and a full results button 910. The header section 906 includes information about the inline command, such as that the inline command is an inline search command and that, in this example, the search query text entry 112 is "Bush inauguration date." In some aspects, the header section 906 includes additional or different information.

The replacement content selector 908 is a user interface element that lists a plurality of potential options for the replacement content 402. Examples of the user interface element of the replacement content selector 908 include list dropdown lists, list boxes, radio buttons, and other types of selectors. The replacement content selector 908 operates to receive a user selection of one of the potential options for the replacement content 402. Upon receiving a selection, the content authoring tool 106 replaces the inline command input needed indicator 902 with the selected option for the replacement content 402.

In this example, the replacement content selector 908 includes a first option 912 and a second option 914. The first option 912 has the value "Jan. 20, 1989," (i.e., the inauguration date of President George H. W. Bush). The second option 914 has the value "Jan. 20, 2001" (i.e., the first inauguration date of President George W. Bush). In some aspects, depending on the number of possible results returned, the replacement content selector 908 includes more options. In this example, the replacement content selector 908 includes only the potential replacement text. In other aspects, however, additional information may be included as well. For example, the replacement content selector 908 may also include additional contextual information about the options such as that the first option relates to President George H. W. Bush, while the second option relates to President George W. Bush. Other example of additional information may include a portion of the content that surrounded the potential replacement text on its source website, a hyperlink to the source website, or other types of information.

In some aspects, the popup content selection window 904 additionally includes the full results button 910. The full results button 910 is a user-actuatable control that, when actuated, shows the full query results. Although the full results button 910 is described as a button herein, in other aspects, other types of user-actuatable controls are used. In some aspects, when the full results button 910 is actuated, a browser window is displayed with the search results. The user may then navigate through the displayed search results to try to find the replacement content 402. An example browser of the full results is illustrated and described with respect to at least FIG. 10.

In this example, the notification message region 306 includes the message 916. The message 916 indicates that the inline command requires additional user input and reads: "Multiple results found for 'Bush inauguration date'." In this example, the message 916 includes the search query text entry 112. In some aspects, the message 916 may also include information about the options for the replacement content. In aspects, the notification message region 306 includes a user-actuatable control that, when actuated, causes the popup content selection window 904 to be displayed.

Figure 10:
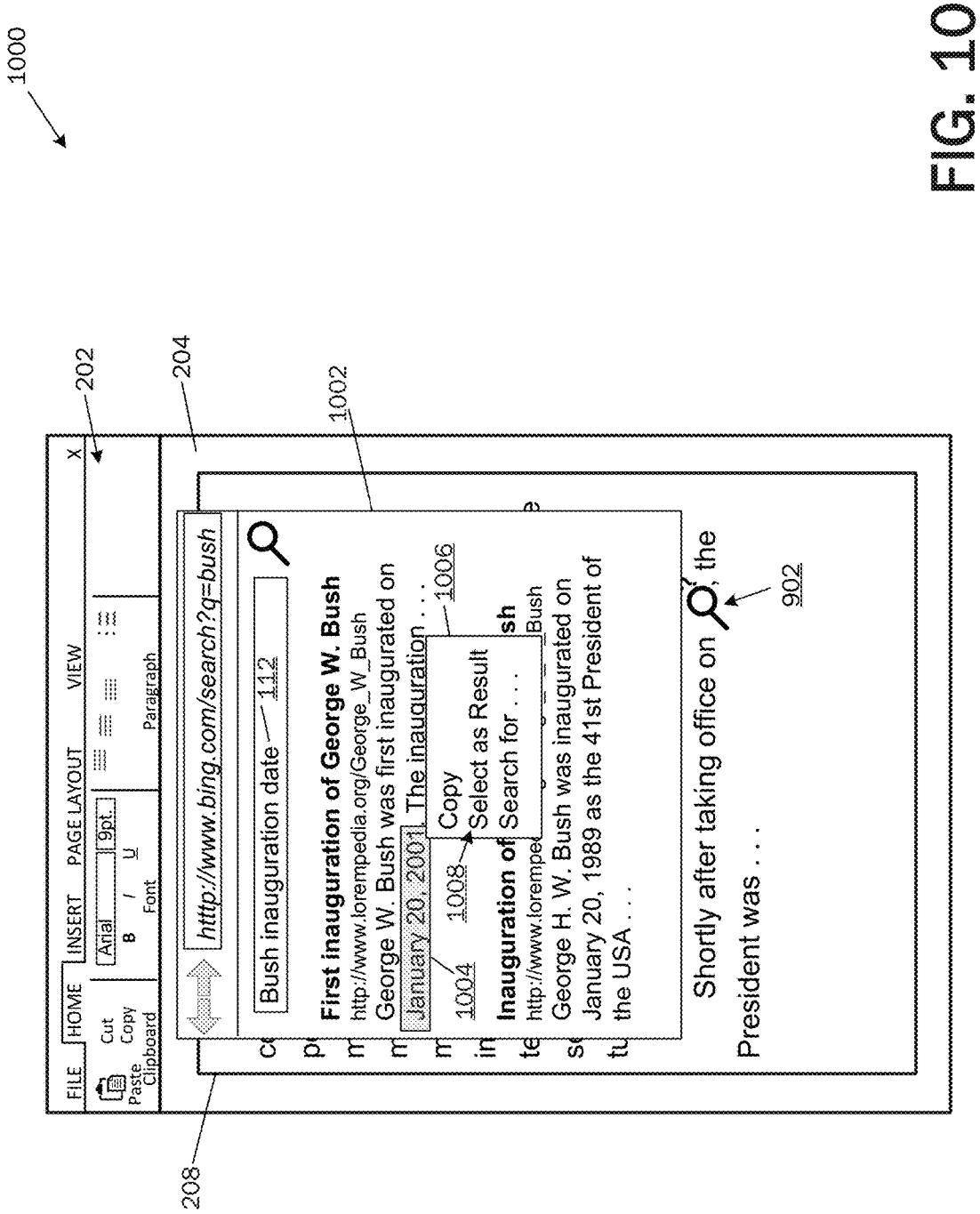
FIG. 10 illustrates an example user interface screen generated by aspects of the content authoring tool of FIG. 1 when an example inline search does not identify options for replacement content.

Turning now to FIG. 10, an example user interface screen 1000 generated by aspects of the content authoring tool 106 and displayed by the user computing device 102 is illustrated. In aspects, the user interface screen 1000 is displayed when a user has selected to review the full search results after an inline search. In aspects, the screen 1000 includes the toolbar 202, the content region display area 204, and a browser window 1002.

The browser window 1002 is a window for browsing through search results. In some aspects, the browser window 1002 is integrated with the content authoring tool 106. In other aspects, the browser window 1002 is generated by a separate web browser application. The browser window 1002 may include at least some capabilities of web browser, such as displaying web pages and receiving selections from a user of hyperlinks to navigate to other web pages.

In aspects, the browser window 1002 displays the search query text entry 112 in a search prompt and related search results. In this example, the browser window 1002 includes a user selection 1004 and a popup menu 1006. The user selection 1004 corresponds to a portion of the displayed search results that a user has selected (e.g., by clicking and dragging with a mouse, or touching on a touch screen). In some aspects, the user selection 1004 is an actuatable control, which, when actuated, causes the popup menu 1006 to be displayed. In aspects, the popup menu 1006 includes one or more actions to be performed with the user selection 1004, including the select as result option 1008. When selected, the select as result option 1008 causes the user selection 1004 to be used as the replacement content 402, and the content authoring tool 106 replaces the inline command input needed indicator 902 on the page 208.

Figure 11:
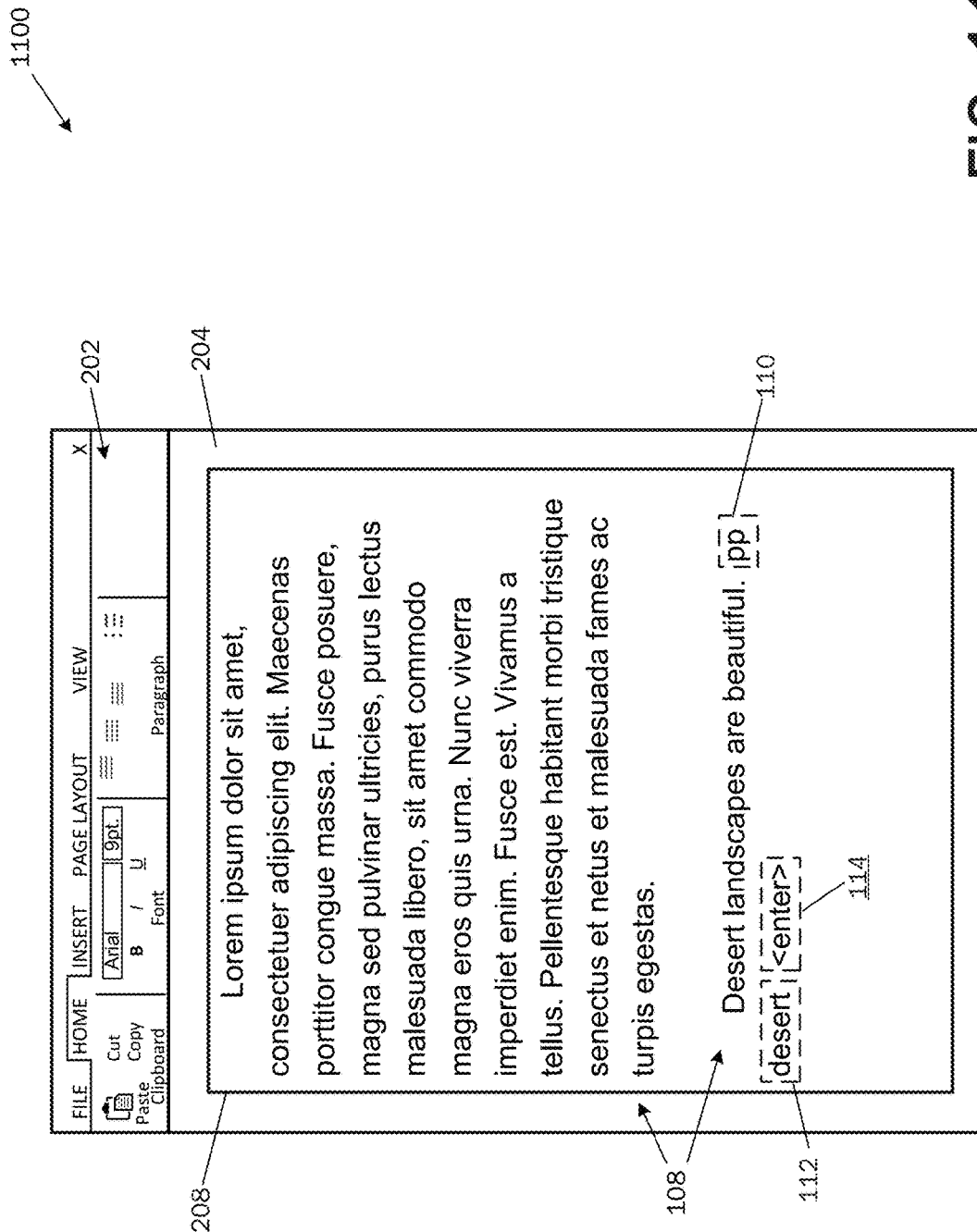
FIG. 11 illustrates an example user interface screen generated by aspects of the content authoring tool of FIG. 1 while another example inline command is being initiated.

FIG. 11 illustrates an example user interface screen 1100 generated by aspects of the content authoring tool 106 and displayed by the user computing device 102. The screen 1100 may be similar to the screen 600, except that the screen 1100 illustrates a picture search inline command. In aspects, the screen 1100 includes the toolbar 202 and the content region display area 204. In this example, a user is performing an inline picture search.

In this example, the page 208 includes the text entry 108, the trigger entry 110, the search query text entry 112, and the second trigger entry 114. In this example, the trigger entry 110 is "pp", which is associated with an inline picture search command. Of course, in other aspects, "pp" may be associated with a different command, or a different trigger entry may be associated with an inline picture search. After receiving the trigger entry 110, the search query text entry 112 is received. In this example, the search query text entry 112 is "desert". In aspects, the inline picture search command attempts to identify at least one picture based on the search query text entry 112.

Upon receiving the second trigger entry 114, the content authoring tool 106 begins performing an inline picture search using the search query text entry 112. The content authoring tool 106 generates an inline picture search query based on the search query text entry 112. The content authoring tool 106 then executes the inline picture search query using a search tool. In some aspects, the same search tool is used for inline picture search commands as is used for inline search commands. Alternatively, in some aspects, a different search tool is used for the inline picture search command than is used for the inline search command.

Figure 13:
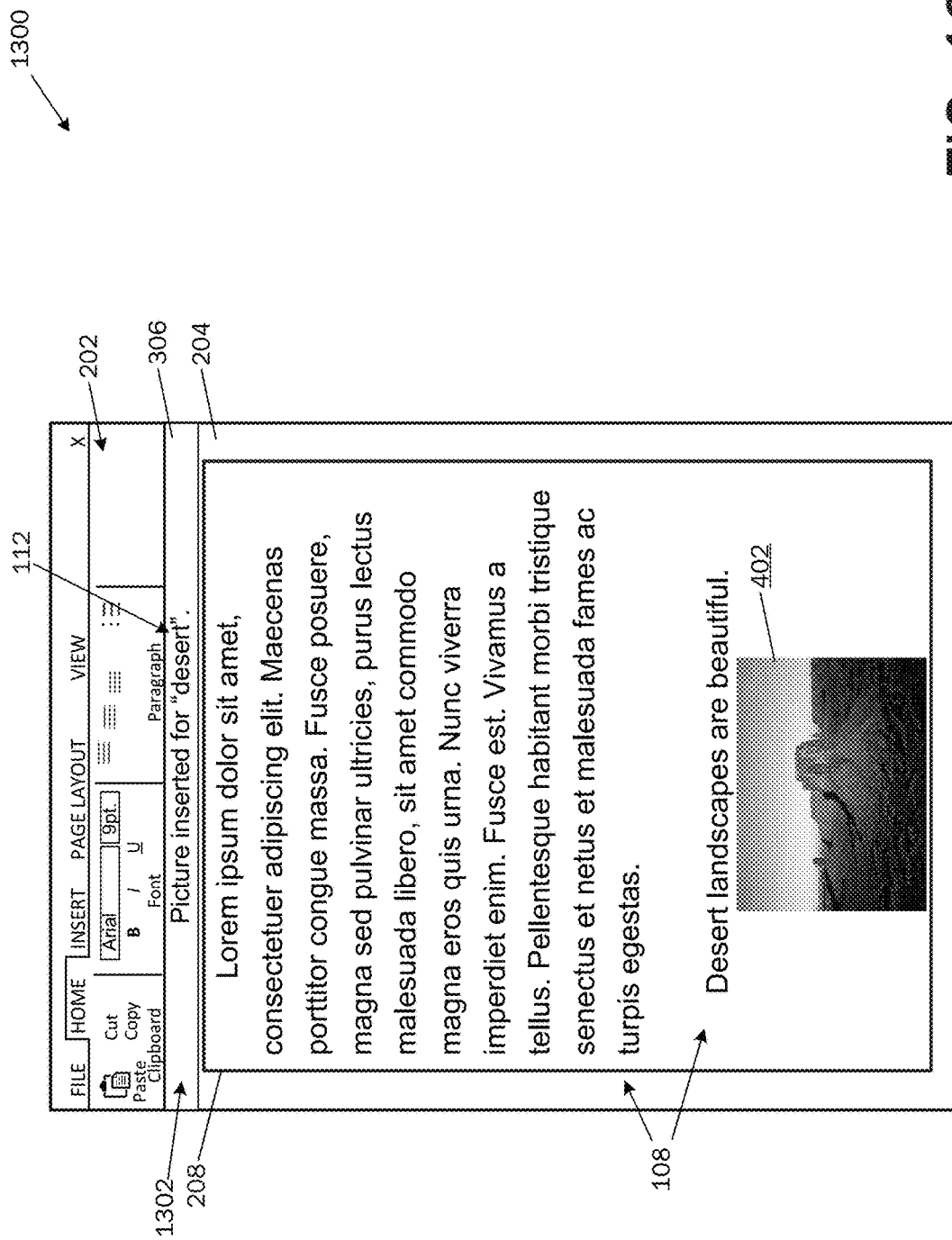
FIG. 13 illustrates an example user interface screen generated by aspects of the content authoring tool of FIG. 1 after another example inline command has been completed.

In some aspects, the content authoring tool 106 can continue to receive text input from the user while the inline picture search command is being completed. When the inline picture search command is completed, the trigger entry 110 and the search query text entry 112 are replaced by the replacement content 402 (e.g., as shown in FIG. 13). One of ordinary skill in the art will appreciate that the same or other trigger entry 110 may be used to search for icons and other non-picture graphical elements.

Figure 12:
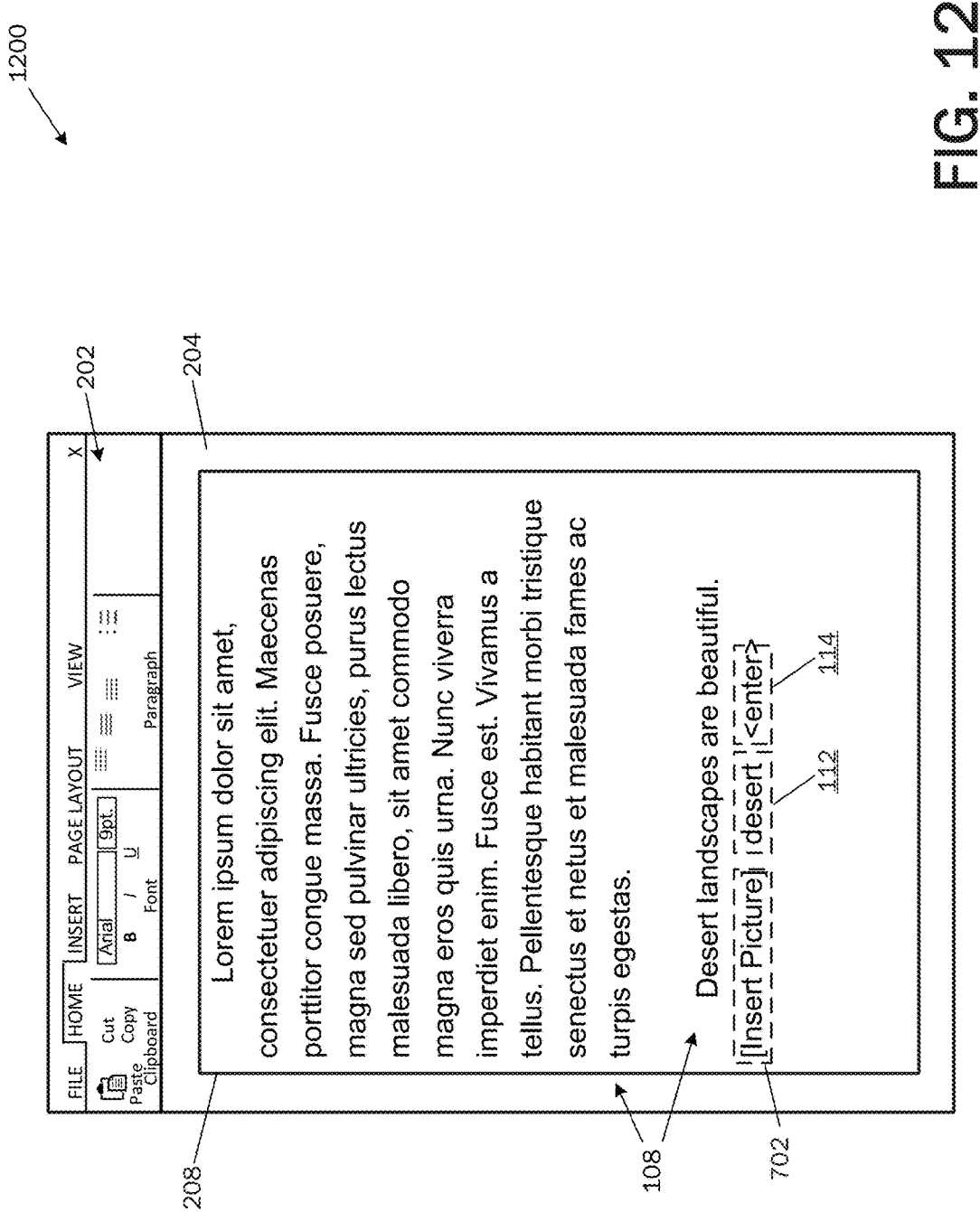
FIG. 12 illustrates an example user interface screen generated by aspects of the content authoring tool of FIG. 1 while another example inline command is being initiated.

FIG. 12 illustrates an example user interface screen 1200 generated by aspects of the content authoring tool 106 and displayed by the user computing device 102. The screen 1200 may be similar to the screen 800, except that screen 1200 illustrates a picture search inline command. In aspects, the screen 1200 includes the toolbar 202 and the content region display area 204. In this example, a user is performing an inline picture search.

In this example, the page 208 includes the text entry 108, the inline command descriptor 702, the search query text entry 112, and the second trigger entry 114. As described previously with respect to FIG. 7, the inline command descriptor 702 replaces the trigger entry 110 in at least some aspects. As shown in this example, the trigger entry 110 (e.g., "pp" as shown in FIG. 11 with respect to an inline picture search) has been replaced by the inline command descriptor 702, which reads: "[Insert Picture]".

As described previously with respect to FIG. 11, upon receiving the second trigger entry 114, the content authoring tool 106 begins performing an inline picture search using the search query text entry 112. In some aspects, the post-command text entry 304 (not shown) may be received while the content authoring tool 106 is performing the inline picture search. When the inline picture search is completed, the inline command descriptor 702 and the search query text entry 112 are replaced by the replacement content 402 (e.g., as shown in FIG. 13).

Turning now to FIG. 13, the example of FIG. 11 is continued. FIG. 13 illustrates an example user interface screen 1300 generated by aspects of the content authoring tool 106 and displayed by the user computing device 102. In aspects, the user interface screen 1300 is displayed after an inline picture search command is completed (e.g., the inline command that is described as being initiated in FIG. 11). In this example, the screen 1300 includes the toolbar 202, the content region display area 204, and the notification message region 306.

The content region display area 204 includes the page 208. The page 208 includes the text entry 108 and the replacement content 402. The replacement content 402 includes content generated by the inline command. In this example, the replacement content 402 is generated based on the query results 124 (shown in FIG. 1) from the inline picture search command. As shown in FIG. 13, the replacement content 402 includes a picture of a desert landscape.

In this example, the query results 124 for the search query text entry 112 of "desert" included a picture of a desert landscape that had a high confidence score. In this example, the content authoring tool 106 automatically replaced the trigger entry 110 and the search query text entry 112 with the replacement content 402. Although not shown in this example, in some aspects, the content authoring tool 106 replaces the trigger entry 110 and the search query text entry 112 with the inline search indicator 302 (such as is illustrated and described with respect to at least FIG. 3) while the inline picture search is being performed. In these aspects, the content authoring tool 106 replaces the inline search indicator 302 with the replacement content 402. Alternatively, if the query results 124 do not include a high confidence answer, the content authoring tool 106 may generate a different user interface for the user to identify the desired replacement content 402 from potential options for the replacement content 402 (e.g., multiple pictures). In aspects, the interfaces for selecting a replacement picture from multiple options is similar to the example interfaces that have been previously illustrated and described with respect to at least FIGS. 9-10.

In some aspects, the screen 1300 includes the notification message region 306. In this example, the notification message region 306 includes the message 1302. The message 1302 indicates that the inline picture search command requires additional user input and reads: "Picture inserted for 'desert'.". In this example, the message 1302 includes the search query text entry 112. In some aspects, the message 1302 may also include information about the picture include in the replacement content 402, such as a thumbnail of the picture, the source of the picture, etc. In aspects, the notification message region 306 includes a user-actuatable control that when actuated performs an action related to the inline picture search command or the replacement content 402. For example, actuation of the control may bring the focus of the content authoring tool 106 to the replacement content 402 (e.g., by repositioning a cursor for entering text or switching to the page 208 if another page is being shown) or may display the replacement content 402 in a popup window.

Because it is likely that for most picture searches there will be multiple different pictures that match the query, some aspects include tools for viewing or selecting other pictures to use as the replacement content. For example, in some aspects when the replacement content 402 is clicked on (or touched), alternate pictures are shown that can be selected to replace the picture currently displayed in the replacement content 402.

Figure 14:
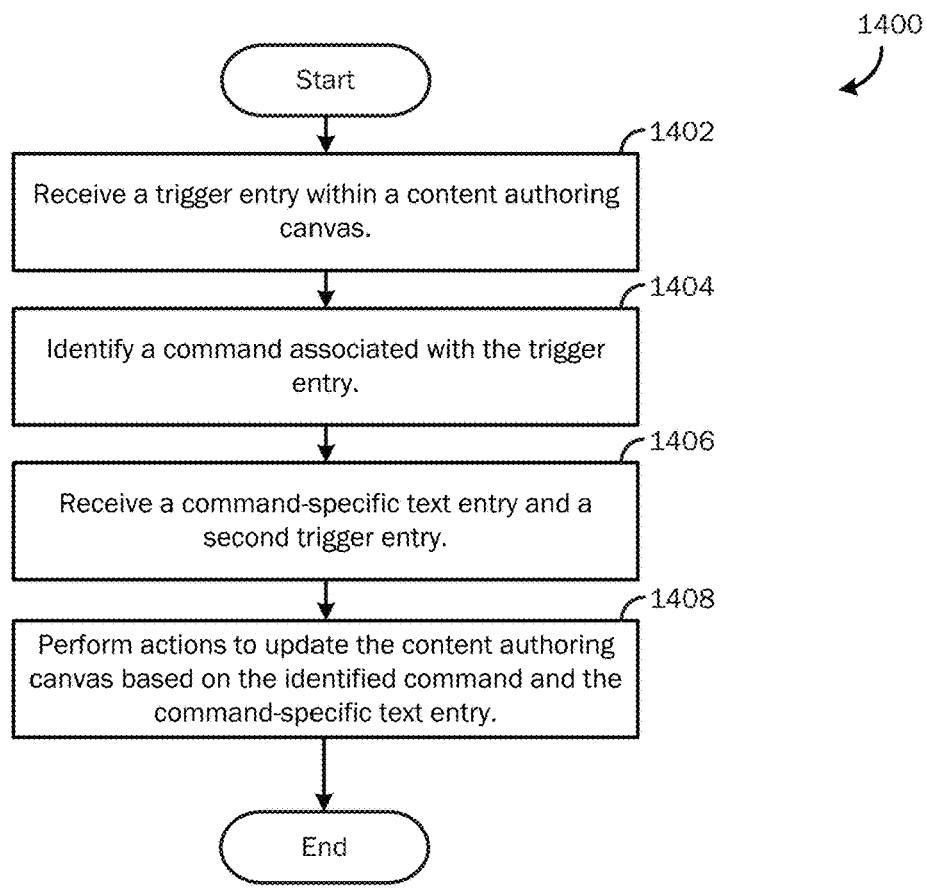
FIG. 14 illustrates an exemplary method for performing an inline command performed by aspects of the system of FIG. 1.

FIG. 14 illustrates an exemplary method 1400 for performing an inline command. As an example, the method 1400 may be executed by a component of an exemplary system such as the system 100. For example, the method 1400 may be performed by the content authoring tool 106 to perform an inline command entered by a user. In examples, the method 1400 may be executed on a device comprising at least one processor configured to store and execute operations, programs, or instructions.

At operation 1402, a trigger entry is received within a content authoring canvas. As described previously, the trigger entry may comprise a sequence of characters input by the user through keystrokes. In aspects, the characters are displayed in the content authoring canvas. Examples of a content authoring canvas include a page in a document content file, a spreadsheet in a spreadsheet content file, and a slide in a presentation content file.

At operation 1404, a command associated with the trigger entry is identified. In some aspects, the command is identified by searching for a record in a table that matches the received trigger entry. In other aspects, the command is identified using another data structure that maps trigger entries to commands.

In some aspects, upon identifying the command, the content authoring tool 106 will also identify one or more operations to perform, such as displaying an indication that the trigger entry has been received, displaying a prompt for command-specific information and redirecting keystrokes from the user to the prompt, etc.

At operation 1406, a command-specific text entry and a second trigger entry are received. The command-specific text entry varies based on the identified command. For example, if the identified command is an inline search command, the command-specific text entry is a search query text entry. Other examples of command-specific text entry include a picture search query text entry for an inline picture search, a table properties text entry for an inline table command, a font properties text entry for an inline font command, etc.

In some aspects, the command-specific text entry is received and displayed within the content authoring canvas. In other aspects, the command-specific text entry is received in a prompt that is displayed for the identified command.

The second trigger entry indicates that the command-specific text entry has been fully entered. In some aspects, the second trigger entry is signaled by the user pressing the enter key. Additionally or alternatively, the second trigger entry is a combination of keys. As yet another alternative, the second trigger entry is received when the user actuates a user-actuatable control, such as a button.

At operation 1408, actions are performed to update the content authoring canvas based on the identified command and the command-specific text entry. Depending on the identified command, various actions are then performed to update the content authoring surface. For example, with an inline search command, a search is performed for replacement content 402 for at least the trigger entry on the content authoring canvas. If the command is an inline picture search command, a search is performed for a picture that matches the picture query text entry, and the picture is added to the content authoring canvas in place of at least the trigger entry. As another example, with an inline table command, a table is generated based on the parameters specified in the command-specific text entry and used to replace at least the trigger entry. As a further example, with an inline font command, the font settings for the content authoring tool 106 are modified based on the command-specific text entry. In various aspects, the font settings changes affect previously entered text, future text entries, or both.

Figure 15:
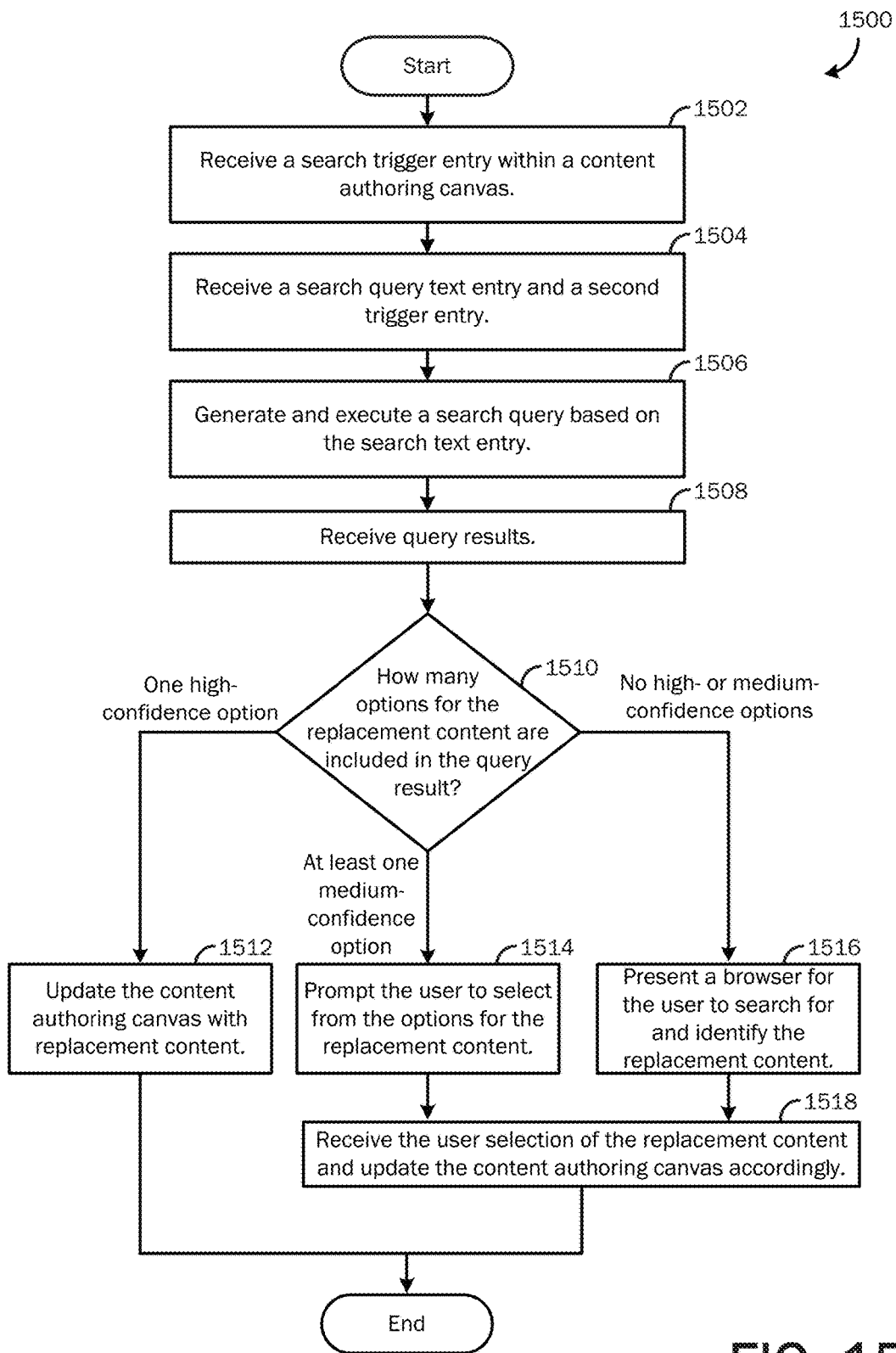
FIG. 15 illustrates an exemplary method for performing an inline search command performed by aspects of the system of FIG. 1.

FIG. 15 illustrates an exemplary method 1500 for performing an inline search command. As an example, the method 1500 may be executed by a component of an exemplary system, such as the system 100. For example, the method 1500 may be performed by the content authoring tool 106 to perform an inline search command entered by a user. In examples, the method 1500 may be executed on a device comprising at least one processor configured to store and execute operations, programs, or instructions. The example method 1500 is similar to the example method 1400, except that it is specific to an inline search command.

At operation 1502, a search trigger entry is received within a content authoring canvas. The operation 1502 may be similar to the previously described operation 1402.

At operation 1504, a search text entry and a second trigger entry are received. The operation 1504 may be similar to the previously described operation 1406.

At operation 1506, a search query is generated and executed based on the received search text entry. In some aspects, the search query is generated based on the received search query text entry. Further, in some aspects, the query is generated by including contextual information extracted from elsewhere in the document or information about the user, which may allow the search tool 118 to provide search results that better fit the user or the document. Additionally, in some aspects, the generated query may include the document or a portion thereof so that the search tool 118 can extract context from the document. The contextual information may allow the search tool 118 to interpret ambiguous terms, such as homographs. Further, in some aspects, when the query is generated, if a homograph or otherwise ambiguous term is included in the search query text, the generated query may replace the homograph or ambiguous term with a synonym, or the generated query may include additional terms that provide context for the search and thereby clarify the desired meaning of the homograph or ambiguous term.

In some aspects, the query is executed by transmitting the query over a network to a search tool 118 on a server computing device 104. In other aspects, the query may be performed by a search tool on the user computing device 102. Further, although most of the examples herein relate to performing a Web search, in some aspects, a search is executed locally or on an intranet. For example, a query may be performed to search an employee directory on an intranet to determine, for example, an employee's title, office location, or supervisor's name.

At operation 1508, query results 124 are received. In some aspects, the query results 124 are received over a network from a search tool 118 running on a server computing device 104. Alternatively, the query results 124 may be received from a process running locally on the user computing device 102. In some aspects, the query results 124 are received in an XML format. In other aspects, the query results 124 are received in another format. In some aspects, the query results 124 comprise one or more options for the replacement content 402. Further, in some aspects those options for the replacement content 402 are associated with confidence scores, which indicate the confidence that the option represents the replacement content 402 that the user is looking for. The confidence score may be expressed as a percentage or otherwise. In some aspects, the query results 124 comprise a single option, and may omit including a confidence score (e.g., when the search tool determines that there is only one high-confidence option for the replacement text). Further, in some aspects, the query results 124 may comprise a web page containing multiple search results (e.g., when the search tool 118 is unable to identify any high- or medium-confidence options for the replacement content 402).

At operation 1510, it is determined how many options for the replacement content 402 are included in the query result 124. In some aspects, determining how many options also comprises evaluating confidence scores associated with the options included in the query result 124. If a single high-confidence option is included in the query results 124, the method 1500 continues to operation 1512. Determining that a single high-confidence option may comprise comparing a confidence score associated with the option included with the query results 124 to a high-confidence threshold value. For example, if the confidence score is greater than ninety percent, it may be determined that the results include one high-confidence option. Alternatively, in some aspects, when the search tool 118 includes only a single option (e.g., without a confidence score) in the query results 124, it is determined that the query results 124 include one high-confidence option. Other aspects use other high-confidence threshold values that may be higher or lower than ninety percent.

If, instead, the query results 124 include at least one medium confidence option, the method 1500 proceeds to operation 1514. Determining that the query results 124 include at least one medium confidence option may comprise comparing the confidence score associated with options in the query results 124 to a medium-confidence threshold range. For example, the medium-confidence threshold range may be ten percent to ninety percent. Other aspects use other ranges for the medium-confidence threshold range. Additionally, in some aspects, when the search tool 118 includes multiple options (e.g., without confidence scores) in the query results 124, it is determined that the query results 124 include at least one medium confidence option.

Further, if the query results 124 include no high- or medium-confidence options, the method 1500 proceeds to operation 1516. Determining that the query results 124 include no high- or medium-confidence options may comprise comparing the confidence scores to a low-confidence threshold value, such as ten percent. If all of the options in the query result are associated with confidence scores that are equal to or below the low-confidence threshold, it may be determined that the query results 124 include no high- or medium-confidence results. Some aspects use a different value that is higher or lower for the low-confidence threshold value. In some aspects, determining that the query results 124 do not include any high- or medium-confidence options comprises receiving empty query results 124 from the search tool 118. Alternatively or additionally, the search tool 118 may return a hyperlink to a webpage that includes search results (e.g., for launching a browser window that shows the search results) or the contents of a webpage that includes the search results (e.g., for display in a popup window).

At operation 1512, the content authoring canvas is updated with the replacement content 402 based on the high-confidence option. In some aspects, one or both of the trigger entry and the search text entry are replaced with the high-confidence option. In some aspects, the high-confidence option may be modified or formatted based on known user preferences or defined settings before being added to the content authoring canvas. For example, if the high-confidence option includes a distance defined in miles and the user has a known preference for kilometers, the distance may be converted to kilometers before being added to the content authoring canvas.

At operation 1514, the user is prompted to select from the medium-confidence options for the replacement content 402. In some aspects, prompting the user comprises displaying a user interface element to present the medium-confidence options to the user. Additionally, in some aspects, the user can select to view the full search results in a browser as well (e.g., as described with respect to operation 1516). Further, in some aspects, the content authoring tool 106 evaluates the medium-confidence options from the search results based on additional context in the document including other text entered before or after the inline search was initiated to identify the medium-confidence options that are most likely to be selected.

At operation 1516, a browser is presented for the user to search for and identify the replacement content 402. In some aspects, the browser is a separate application from the content authoring tool 106, and the browser loads a webpage containing the search results. The user may then navigate within that webpage to explore the results until appropriate replacement content 402 is found. Alternatively, the browser may be a window generated by the content authoring tool 106 that displays the content of the search results provided by the search tool 118. The user may view this content and select the replacement content 402, if available.

At operation 1518, the user selection for the replacement content 402 is received and the content authoring canvas is updated accordingly. In some aspects, updating the content authoring canvas comprises replacing one or both of the trigger entry and the search text entry with the selected replacement content 402.

Operations 1512, 1514, and 1516 are all examples of presenting the replacement content to the user. Depending on the confidence scores, different techniques for presenting the replacement content 402 may be used.

Although the method 1500 describes receiving the trigger entry within the content authoring canvas, in some aspects, the trigger entry is received via a shortcut key (e.g., a combination of keystrokes that do not insert a character into the content authoring canvas) or by a user-actuatable control being actuated (e.g., a button on a toolbar in the content authoring tool 106).

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 16:
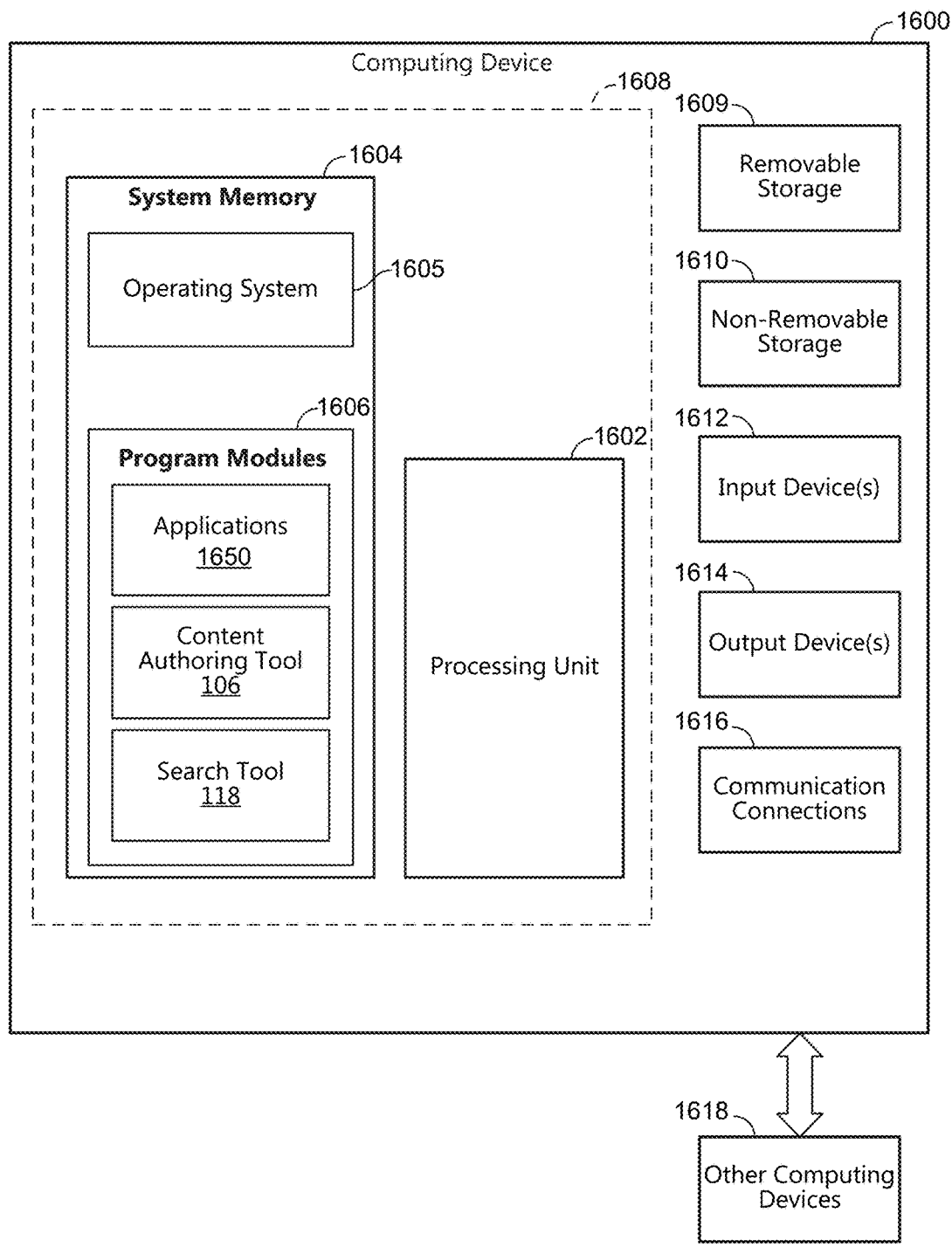
FIG. 16 is a block diagram illustrating example physical components of a computing device with which aspects of the invention may be practiced.
Figure 17A:
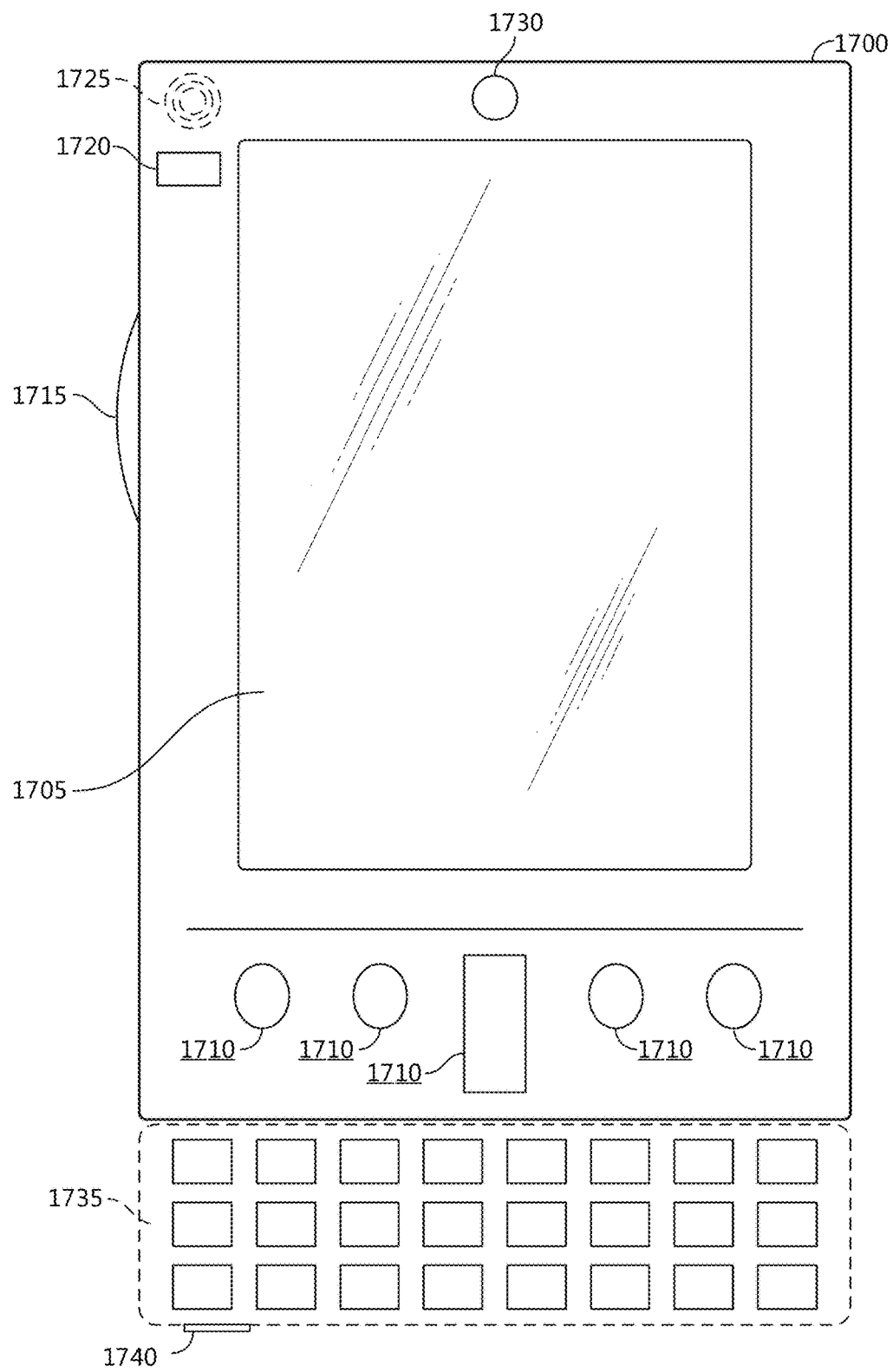
FIGS. 17A and 17B are block diagrams of a mobile computing device with which aspects of the present invention may be practiced.
Figure 17B:
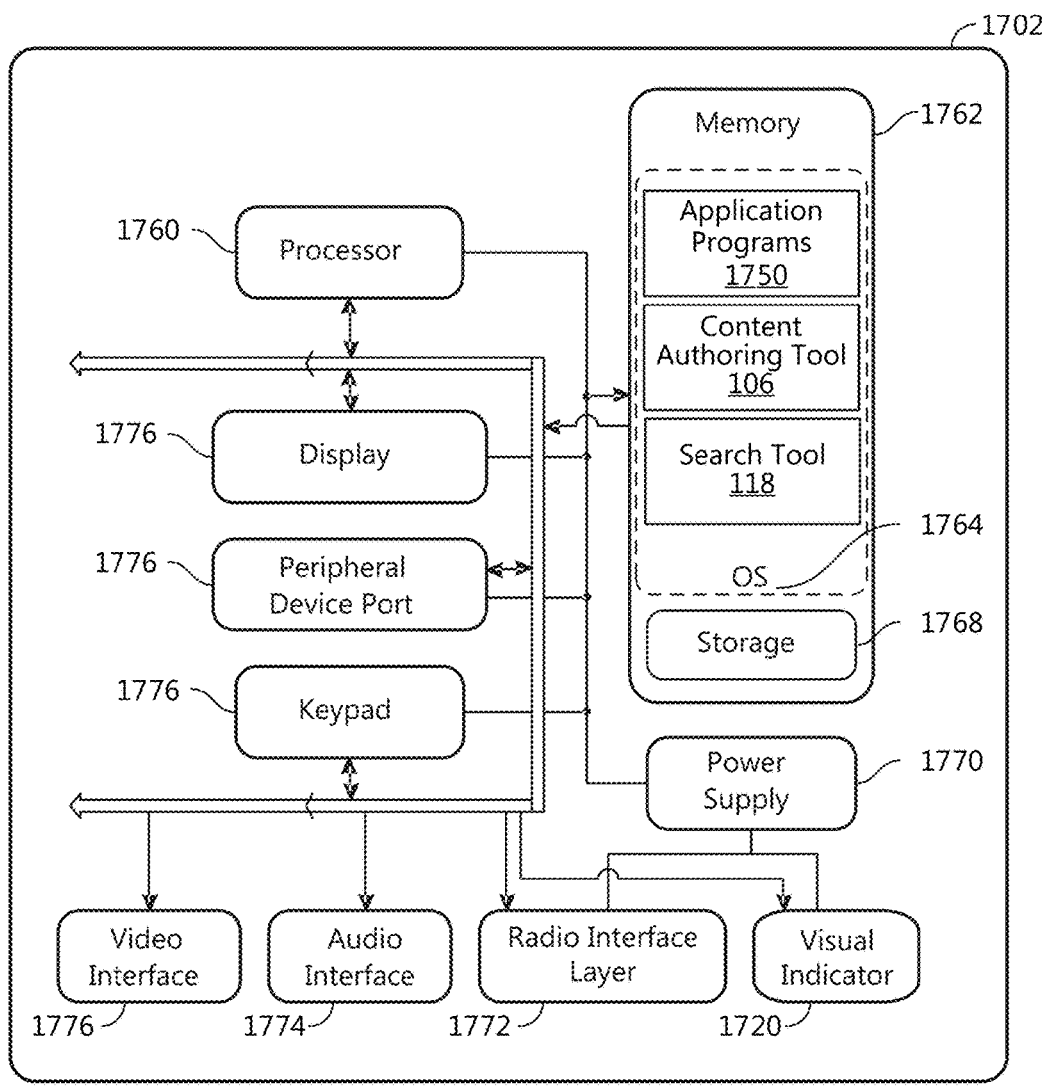
Figure 18:
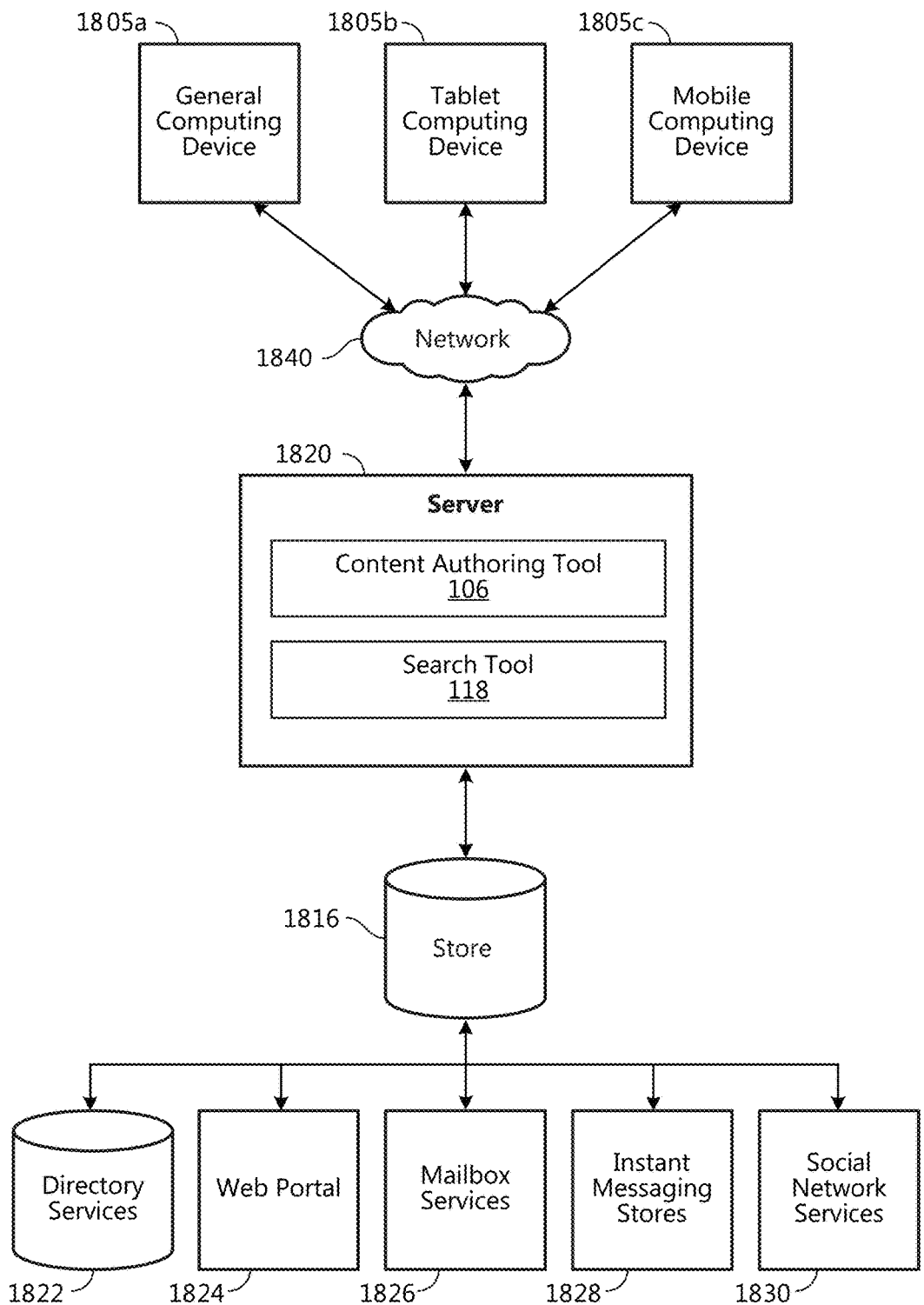
FIG. 18 is a block diagram of a distributed computing system in which aspects of the present invention may be practiced.

FIGS. 16-18 and the associated descriptions provide a discussion of a variety of operating environments in which examples are practiced. However, the devices and systems illustrated and discussed with respect to FIGS. 16-18 are for purposes of example and illustration and are not limiting of a vast number of computing device configurations that are utilized for practicing aspects, described herein.

FIG. 16 is a block diagram illustrating physical components (i.e., hardware) of a computing device 1600 with which examples of the present disclosure may be practiced. In a basic configuration, the computing device 1600 includes at least one processing unit 1602 and a system memory 1604. According to an aspect, depending on the configuration and type of computing device, the system memory 1604 comprises, but is not limited to, volatile storage (e.g., random access memory), non-volatile storage (e.g., read-only memory), flash memory, or any combination of such memories. According to an aspect, the system memory 1604 includes an operating system 1605 and one or more program modules 1606 suitable for running software applications 1650. According to an aspect, the system memory 1604 includes content authoring tool 106 and the search tool 118. The operating system 1605, for example, is suitable for controlling the operation of the computing device 1600. Furthermore, aspects are practiced in conjunction with a graphics library, other operating systems, or any other application program, and is not limited to any particular application or system. This basic configuration is illustrated in FIG. 16 by those components within a dashed line 1608. According to an aspect, the computing device 1600 has additional features or functionality. For example, according to an aspect, the computing device 1600 includes additional data storage devices (removable and/or non-removable) such as, for example, magnetic disks, optical disks, or tape. Such additional storage is illustrated in FIG. 16 by a removable storage device 1609 and a non-removable storage device 1610.

As stated above, according to an aspect, a number of program modules and data files are stored in the system memory 1604. While executing on the processing unit 1602, the program modules 1606 (e.g., the content authoring tool 106) perform processes including, but not limited to, one or more of the stages of the method 1400 and 1500 illustrated in FIGS. 14 and 15. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 16 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 1600 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 1600 has one or more input device(s) 1612 such as a keyboard, a mouse, a pen, a sound input device, a touch input device, etc. The output device(s) 1614 such as a display, speakers, a printer, etc. are also included according to an aspect. The aforementioned devices are examples and others may be used. According to an aspect, the computing device 1600 includes one or more communication connections 1616 allowing communications with other computing devices 1618. Examples of suitable communication connections 1616 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 1604, the removable storage device 1609, and the non-removable storage device 1610 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1600. According to an aspect, any such computer storage media is part of the computing device 1600. Computer storage media do not include a carrier wave or other propagated data signal.

According to an aspect, communication media are embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 17A and 17B illustrate a mobile computing device 1700, for example, a mobile telephone, a smart phone, a tablet personal computer, a laptop computer, and the like, with which aspects may be practiced. With reference to FIG. 17A, an example of a mobile computing device 1700 for implementing the aspects is illustrated. In a basic configuration, the mobile computing device 1700 is a handheld computer having both input elements and output elements. The mobile computing device 1700 typically includes a display 1705 and one or more input buttons 1710 that allow the user to enter information into the mobile computing device 1700. According to an aspect, the display 1705 of the mobile computing device 1700 functions as an input device (e.g., a touch screen display). If included, an optional side input element 1715 allows further user input. According to an aspect, the side input element 1715 is a rotary switch, a button, or any other type of manual input element. In alternative examples, mobile computing device 1700 incorporates more or fewer input elements. For example, the display 1705 may not be a touch screen in some examples. In alternative examples, the mobile computing device 1700 is a portable phone system, such as a cellular phone. According to an aspect, the mobile computing device 1700 includes an optional keypad 1735. According to an aspect, the optional keypad 1735 is a physical keypad. According to another aspect, the optional keypad 1735 is a "soft" keypad generated on the touch screen display. In various aspects, the output elements include the display 1705 for showing a graphical user interface (GUI), a visual indicator 1720 (e.g., a light emitting diode), and/or an audio transducer 1725 (e.g., a speaker). In some examples, the mobile computing device 1700 incorporates a vibration transducer for providing the user with tactile feedback. In yet another example, the mobile computing device 1700 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 1700 incorporates peripheral device port 1740, such as an audio input (e.g., a microphone jack), an audio output (e.g., a headphone jack), and a video output (e.g., a HDMI port) for sending signals to or receiving signals from an external device.

FIG. 17B is a block diagram illustrating the architecture of one example of a mobile computing device. That is, the mobile computing device 1700 incorporates a system (i.e., an architecture) 1702 to implement some examples. In one example, the system 1702 is implemented as a "smart phone" capable of running one or more applications (e.g., browser, e-mail, calendaring, contact managers, messaging clients, games, and media clients/players). In some examples, the system 1702 is integrated as a computing device, such as an integrated personal digital assistant (PDA) and wireless phone.

According to an aspect, one or more application programs 1750 are loaded into the memory 1762 and run on or in association with the operating system 1764. Examples of the application programs include phone dialer programs, e-mail programs, personal information management (PIM) programs, word processing programs, spreadsheet programs, Internet browser programs, messaging programs, and so forth. According to an aspect, the content authoring tool 106 and search tool 118 are loaded into memory 1762. The system 1702 also includes a non-volatile storage area 1768 within the memory 1762. The non-volatile storage area 1768 is used to store persistent information that should not be lost if the system 1702 is powered down. The application programs 1750 may use and store information in the non-volatile storage area 1768, such as e-mail or other messages used by an e-mail application, and the like. A synchronization application (not shown) also resides on the system 1702 and is programmed to interact with a corresponding synchronization application resident on a host computer to keep the information stored in the non-volatile storage area 1768 synchronized with corresponding information stored at the host computer. As should be appreciated, other applications may be loaded into the memory 1762 and run on the mobile computing device 1700.

According to an aspect, the system 1702 has a power supply 1770, which is implemented as one or more batteries. According to an aspect, the power supply 1770 further includes an external power source, such as an AC adapter or a powered docking cradle that supplements or recharges the batteries.

According to an aspect, the system 1702 includes a radio 1772 that performs the function of transmitting and receiving radio frequency communications. The radio 1772 facilitates wireless connectivity between the system 1702 and the "outside world," via a communications carrier or service provider. Transmissions to and from the radio 1772 are conducted under control of the operating system 1764. In other words, communications received by the radio 1772 may be disseminated to the application programs 1750 via the operating system 1764, and vice versa.

According to an aspect, the visual indicator 1720 is used to provide visual notifications and/or an audio interface 1774 is used for producing audible notifications via the audio transducer 1725. In the illustrated example, the visual indicator 1720 is a light emitting diode (LED) and the audio transducer 1725 is a speaker. These devices may be directly coupled to the power supply 1770 so that when activated, they remain on for a duration dictated by the notification mechanism even though the processor 1760 and other components might shut down for conserving battery power. The LED may be programmed to remain on indefinitely until the user takes action to indicate the powered-on status of the device. The audio interface 1774 is used to provide audible signals to and receive audible signals from the user. For example, in addition to being coupled to the audio transducer 1725, the audio interface 1774 may also be coupled to a microphone to receive audible input, such as to facilitate a telephone conversation. According to an aspect, the system 1702 further includes a video interface 1776 that enables an operation of an on-board camera 1730 to record still images, video stream, and the like.

According to an aspect, a mobile computing device 1700 implementing the system 1702 has additional features or functionality. For example, the mobile computing device 1700 includes additional data storage devices (removable and/or non-removable) such as, magnetic disks, optical disks, or tape. Such additional storage is illustrated in FIG. 17B by the non-volatile storage area 1768.

According to an aspect, data/information generated or captured by the mobile computing device 1700 and stored via the system 1702 are stored locally on the mobile computing device 1700, as described above. According to another aspect, the data are stored on any number of storage media that are accessible by the device via the radio 1772 or via a wired connection between the mobile computing device 1700 and a separate computing device associated with the mobile computing device 1700, for example, a server computer in a distributed computing network, such as the Internet. As should be appreciated such data/information are accessible via the mobile computing device 1700 via the radio 1772 or via a distributed computing network. Similarly, according to an aspect, such data/information are readily transferred between computing devices for storage and use according to well-known data/information transfer and storage means, including electronic mail and collaborative data/information sharing systems.

FIG. 18 illustrates one example of the architecture of a system for latency-reduced document change discovery as described above. Content files developed, interacted with, or edited in association with the content authoring tool 106 are enabled to be stored in different communication channels or other storage types. For example, various content files may be stored using a directory service 1822, a web portal 1824, a mailbox service 1826, an instant messaging store 1828, or a social networking site 1830. The content authoring tool 106 is operative to use any of these types of systems or the like for reducing latency of document change discovery in a co-authoring session, as described herein. According to an aspect, a server 1820 provides the content authoring tool 106 to clients 1805*a,b,c*. As one example, the server 1820 is a web server providing the content authoring tool 106 over the web. The server 1820 provides the content authoring tool 106 over the web to clients 1805 through a network 1840. By way of example, the client computing device is implemented and embodied in a personal computer 1805*a*, a tablet computing device 1805*b* or a mobile computing device 1805*c* (e.g., a smart phone), or other computing device. Any of these examples of the client computing device are operable to obtain content from the store 1816.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method for generating replacement content within a content authoring canvas, comprising:
   receiving a first trigger entry associated with an inline search command in a document content file being authored in the content authoring canvas;
   receiving a search text entry in the document content file and a second trigger entry indicating the search text entry is completed;
   generating a search query based on the search text entry;
   receiving query results based on the generated search query, wherein the query results include at least one option for replacement content; and
   proposing replacement content to replace the search text entry in the document content file based on the at least one option for replacement content.

2. The method of claim 1, wherein the first trigger entry comprises a plurality of keystrokes.

3. The method of claim 2, wherein the plurality of keystrokes are received via a physical keypad.

4. The method of claim 2, wherein the plurality of keystrokes are received via a soft keypad generated on a touch screen display.

5. The method of claim 1, wherein the query results comprise at least one confidence score associated with an option for replacement content from the at least one option for replacement content.

6. The method of claim 5, wherein proposing the replacement content based on the at least one option for replacement content comprises:
   identifying a highest confidence score from the at least one confidence score;
   determining that the highest confidence score exceeds a predetermined confidence threshold; and
   replacing the first trigger entry with the option for replacement content associated with the identified highest confidence score.

7. The method of claim 6, further comprising removing the search text entry from the content authoring canvas.

8. The method of claim 5, wherein proposing the replacement content based on the at least one option for replacement content comprises:
   selecting a plurality of options for replacement content from the at least one option for replacement content;
   presenting the plurality of options for replacement content; and
   receiving a selection of replacement text.

9. The method of claim 1, further comprising:
identifying a data source based on the first trigger entry; and
executing the search query against the identified data source.

10. The method of claim 1, further comprising:
analyzing at least a portion of the content authoring canvas to determine contextual information; and
using the contextual information to select replacement content from the query results.

11. The method of claim 1, wherein generating the search query based on the search text entry further comprises:
analyzing the search text entry for ambiguous terms;
when determined that the search text entry includes ambiguous terms, analyzing the content authoring canvas to identify contextual information for the ambiguous terms; and
modifying the search text entry based on the contextual information.

12. The method of claim 1, wherein the replacement content comprises text.

13. The method of claim 1, wherein the replacement content comprises a picture.

14. A system for generating replacement content within a content authoring canvas, the system comprising:
a computing device, the computing device comprising:
at least one processing device; and
at least one computer readable data storage device storing instructions that, when executed by the at least one processing device, cause the computing device to:
receive a first trigger entry associated with an inline search command in a document content file being authored in the content authoring canvas;
receive a search text entry in the document content file and a second trigger entry indicating the search text entry is completed;
generate a search query based on the search text entry;
receive query results based on the generated search query, wherein the query results include at least one option for replacement content; and
propose replacement content to replace the search text entry in the document content file based on the at least one option for replacement content.

15. The system of claim 14, wherein the search text entry and the second trigger entry are received in the content authoring canvas.

16. The system of claim 14, wherein the instructions, when executed by the at least one processing device, further cause the computing device to generate a prompt for the search text entry upon receiving the first trigger entry.

17. The system of claim 14, wherein the instructions, when executed by the at least one processing device, further cause the computing device to execute the search query.

18. The system of claim 14, wherein the instructions, when executed by the at least one processing device, further cause the computing device to transmit, over a network, the search query to a search tool on a remote computing device.

19. A method for generating replacement content within a content authoring canvas, comprising:
receiving a first trigger entry associated with an inline search command in a document content file being authored in the content authoring canvas, wherein the first trigger entry comprises a plurality of keystrokes;
receiving a search text entry in the document content file and a second trigger entry indicating the search text entry is completed;
generating a search query based on the search text entry;
transmitting the search query to a remote computing device for execution;
receiving query results from the remote computing device, wherein the query results include at least one option for replacement content and at least one confidence score associated with an option for replacement content from the at least one option for replacement content;
identifying a highest confidence score from the at least one confidence score;
comparing the identified highest confidence score to a predetermined confidence threshold; and
upon determining that the identified highest confidence score exceeds the predetermined confidence threshold, replacing the first trigger entry and the search text entry in the document content file with the option for replacement content associated with the identified highest confidence score.

20. The method of claim 19, wherein the plurality of keystrokes are received via a soft keypad generated on a touch screen display.

* * * * *